(12) United States Patent
Robitzkat et al.

(10) Patent No.: US 10,380,913 B2
(45) Date of Patent: Aug. 13, 2019

(54) METHODS AND APPARATUS FOR TECHNICAL AND CUSTOMER SUPPORT FOR INDUSTRIAL CLEANING DEVICES

(71) Applicant: Diversey, Inc., Fort Mill, SC (US)

(72) Inventors: Marc Robitzkat, Utrecht (NL); Simon Price, Cambridgeshire (GB)

(73) Assignee: Diversey, Inc., Fort Mill, SC (US)

( * ) Notice: Subject to any disclaimer, the term of this patent is extended or adjusted under 35 U.S.C. 154(b) by 70 days.

(21) Appl. No.: 15/517,406

(22) PCT Filed: Oct. 5, 2015

(86) PCT No.: PCT/US2015/053980
§ 371 (c)(1),
(2) Date: Apr. 6, 2017

(87) PCT Pub. No.: WO2016/057386
PCT Pub. Date: Apr. 14, 2016

(65) Prior Publication Data
US 2017/0301261 A1    Oct. 19, 2017

Related U.S. Application Data

(60) Provisional application No. 62/060,896, filed on Oct. 7, 2014.

(51) Int. Cl.
*G09B 19/24* (2006.01)
*G06Q 10/06* (2012.01)
(Continued)

(52) U.S. Cl.
CPC ............. *G09B 19/24* (2013.01); *G06Q 10/06* (2013.01); *G06Q 10/20* (2013.01); *G06Q 30/016* (2013.01);
(Continued)

(58) Field of Classification Search
CPC ........ G09B 19/24; G06Q 10/06; G06Q 10/20; G06Q 30/016; G06T 11/60; G06T 13/80; G06T 2200/24; G06F 3/0482
(Continued)

(56) References Cited

U.S. PATENT DOCUMENTS 6,873,876 B1    3/2005  Aisa
8,549,401 B1    10/2013 Hernacki et al.
(Continued)

FOREIGN PATENT DOCUMENTS

WO    WO 2008/096216 A2    8/2008

OTHER PUBLICATIONS

European Patent Office, Communication pursuant to Rules 70(2) and 70a(2) EPC for Application No. 15848751.2, dated May 3, 2018, 1 page, Germany.
(Continued)

*Primary Examiner* — Robert P Bullington
(74) *Attorney, Agent, or Firm* — Alston & Bird LLP

(57) ABSTRACT

The present invention provides methods, systems, computer program products, and apparatuses for providing technical and/or customer support for one or more industrial cleaning devices. Various embodiments provide technical and/or customer support options for training users about one or more industrial cleaning devices and/or how to perform basic and/or regular maintenance tasks, assisting a user in troubleshooting an industrial cleaning device, accessing live customer support, and/or the like. In another example, various embodiments may capture image and/or video data associated with one or more steps a user has performed and provide at least a portion of the captured image and/or video data to customer support personnel for additional troubleshooting and/or instructional assistance. In yet another example, a live video chat with a help person may be
(Continued)

displayed concurrently with instructions for completing at least one step of a maintenance task for an industrial cleaning device presented via augmented reality technology.

21 Claims, 13 Drawing Sheets

(51) Int. Cl.
*G06Q 30/00* (2012.01)
*G06Q 10/00* (2012.01)
*G06T 11/60* (2006.01)
*G06T 13/80* (2011.01)
*G06F 3/0482* (2013.01)

(52) U.S. Cl.
CPC .............. *G06T 11/60* (2013.01); *G06T 13/80* (2013.01); *G06F 3/0482* (2013.01); *G06T 2200/24* (2013.01)

(58) Field of Classification Search
USPC .......................................................... 434/401
See application file for complete search history.

(56) References Cited

U.S. PATENT DOCUMENTS

| | | | |
|---|---|---|---|
| 8,621,362 | B2 | 12/2013 | Castellani et al. |
| 9,261,866 | B2 | 2/2016 | Diller et al. |
| 9,710,968 | B2 | 7/2017 | Dillavou et al. |
| 2001/0039460 | A1 | 11/2001 | Aisa |
| 2002/0059269 | A1 | 5/2002 | McQuown et al. |
| 2002/0156556 | A1* | 10/2002 | Ruffner ................ A01B 69/008 701/23 |
| 2006/0191300 | A1 | 8/2006 | Lim et al. |
| 2008/0133292 | A1 | 6/2008 | Opland et al. |
| 2012/0026530 | A1 | 2/2012 | Tsongas et al. |
| 2012/0249588 | A1 | 10/2012 | Tison et al. |
| 2012/0259973 | A1 | 10/2012 | Windell |
| 2012/0296447 | A1 | 11/2012 | Diller et al. |
| 2012/0303323 | A1 | 11/2012 | Ha et al. |
| 2012/0324118 | A1 | 12/2012 | Pfleider et al. |
| 2013/0028258 | A1 | 1/2013 | Carney et al. |
| 2013/0218783 | A1* | 8/2013 | Anand .................. G06Q 10/20 705/304 |
| 2015/0106710 | A1* | 4/2015 | Dirschus .................. A61L 2/24 715/708 |
| 2017/0301261 | A1 | 10/2017 | Robitzkat et al. |

OTHER PUBLICATIONS

European Patent Office, Extended European Search Report for Application No. 15848751.2, dated Apr. 12, 2018, 8 pages, Germany.

Help Lighting, "Mobile Merged Reality and Virtual Presence", Sep. 7, 2017, 4 pages, retrieved from <https://helplightning.com/next-steps/downloads>0 on May 22, 2018.

Shepard, Bob, "UAB does virtual surgery with VIPAAR and Google Glass", UAB News, Oct. 28, 2013, 5 pages, retrieved from <http://www.uab.edu/news/research/item/3896-uab-does-virtual-surgery-with-vipaar-and-google-glass> on May 31, 2018.

Unknown Author, "Audi Augmented Reality Owner's Manual", Donichi Studio, *YouTube*, <https://www.youtube.com/watch?v=2YqflcbCVZg>, Aug. 20, 2013.

International Preliminary Examing Authority, International Preliminary Report on Patentability for Application No. PCT/US2015/053980, including Applicant's Aug. 8, 2016 response to ISA's Written Opinion, dated Feb. 21, 2017, 39 pages, United Stated Patent and Trademark Office, U.S.A.

International Searching Authority (ISA), International Search Report and Written Opinion for International Application No. PCT/US2015/053980, dated Dec. 22, 2015, 21 pages, United States Patent and Trademark Office, U.S.A.

Lavrinc, Damon, "Figure Out What That Button Does With Audi's Augmented-Reality App", *Autopia*, WIRED, Aug. 8, 2013, 13 pages, retrieved from < http://www.wired.corn(2013/08/audi-ekurzinfo/ >, on Jun. 20, 2014.

Unknown Author, "Augmented Reality: Introduction", *BMW AG*, Sep. 16, 2007 to Dec. 4, 2016, Internet Archive <http://web.archive.org/web/20070916133348/http://www.bmw.com/com/en/owners/service/augmented_reality_introduction_1.html>, 2 pages.

Unknown Author, "Mayday: Get Help for Your Kindle Fire", *Amazon*, 2 pages, retrieved from < http://www.amazon.com/gp/help/customer/display.html?nodeId=201349900 > on Jun. 25, 2014.

Weiss, C. C., "Audi A3 Gets Augmented Reality Owner's Manual App", *Gizmag*, Aug. 15, 2013, 7 pages, retrieved from < http://www.gizmag.com/audi-a3-augmented-reality-manual/28693/ > on Jun. 20, 2014.

European Patent Office, Examination Report for European Patent Application No. 15848751.2, dated Apr. 12, 2019, 7 pages, Germany.

Ong et al., A Novel Maintenance System for Equipment Serviceability Improvement, CIRP Annals—Manufacturing Technology 62, (2013), pp. 39-42.

\* cited by examiner

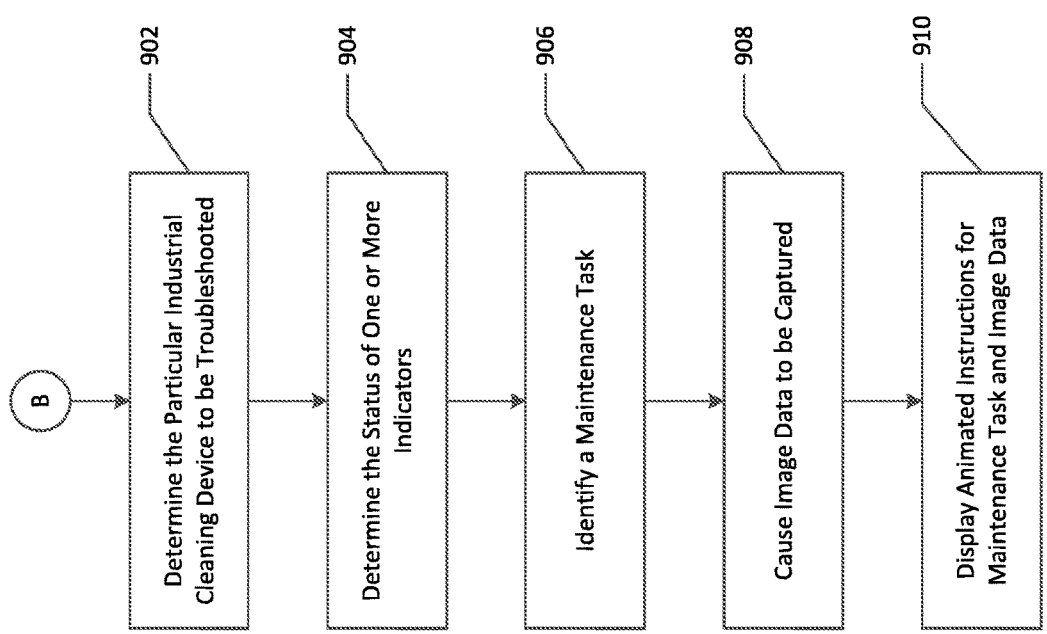

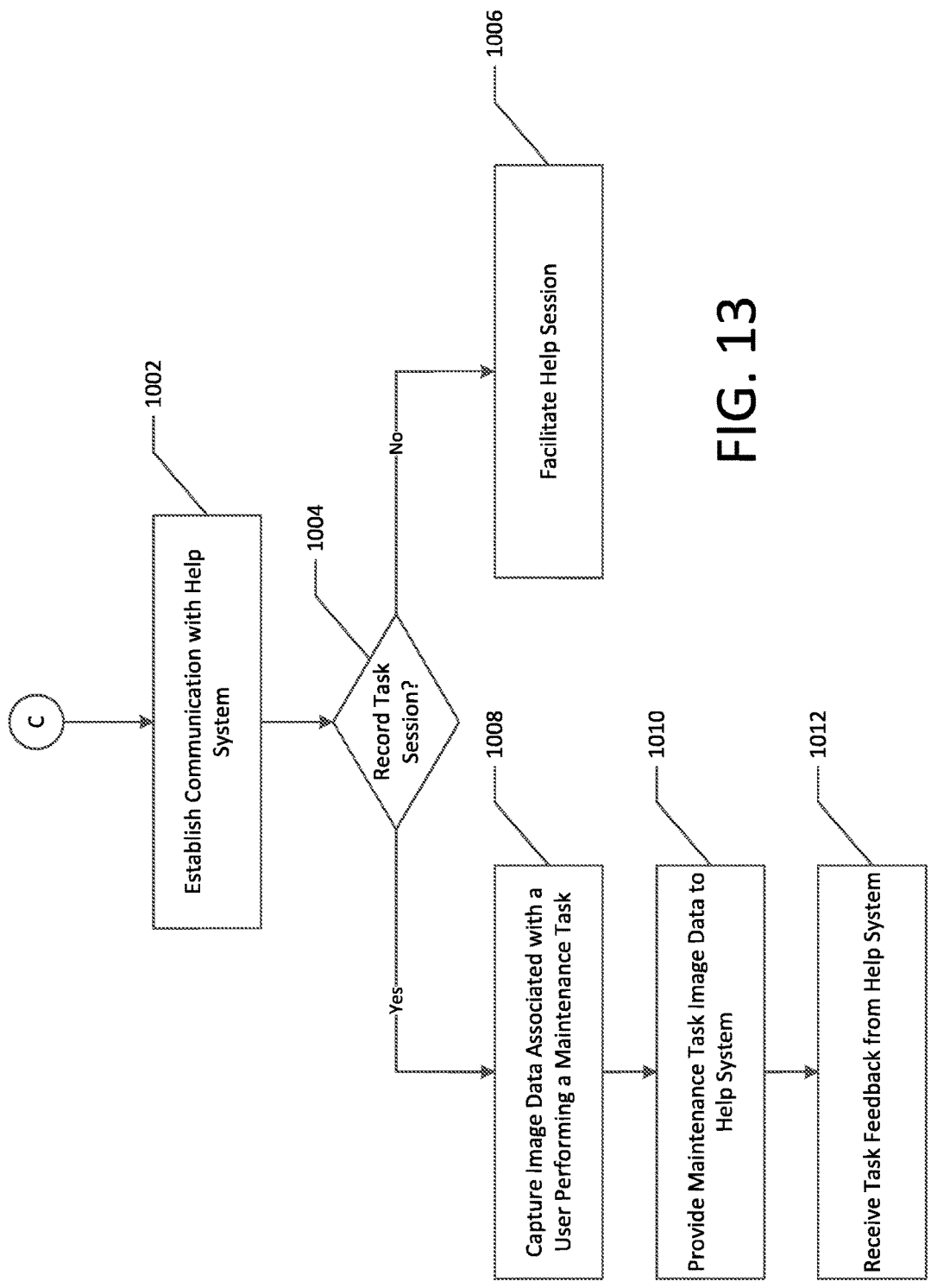

METHODS AND APPARATUS FOR TECHNICAL AND CUSTOMER SUPPORT FOR INDUSTRIAL CLEANING DEVICES

CROSS REFERENCE TO RELATED APPLICATIONS

This application is a National Stage Application, filed under 35 U.S.C. § 371, of International Application No. PCT/US2015/053980, filed Oct. 5, 2015, which claims priority to U.S. Application No. 62/060,896, filed Oct. 7, 2014; the contents both of which are hereby incorporated by reference in their entirety.

TECHNOLOGICAL FIELD

Embodiments of the present invention are generally related to methods and apparatus for providing technical and/or customer support for industrial cleaning devices.

BACKGROUND

An array of industrial cleaning devices may be used in various industrial and commercial cleaning applications. For example, industrial cleaning tends to include the careful mixing and/or dilution of cleaning solutions used for various cleaning applications (e.g., cleaning floors, cleaning solution for ware washers, commercial laundry operations, and/or the like). The mixing, dilution, dispensing and/or application of cleaning solutions may be performed by an industrial cleaning device.

These types of industrial cleaning devices may require training for employees on how to use the industrial cleaning devices. In addition, since these industrial cleaning devices can use consumable products (such as cleaning solutions) that are processed through complex machinery, the employee users should also be trained on how to replace the consumable products once consumed, and how to perform certain tasks for remedying industrial cleaning devices experiencing a fault. This training can impose high costs for establishments using the industrial cleaning devices. This is especially so in the food service and cleaning sectors due to the high turnover of employees in those industries since each new employee requires training.

Also, due to the ubiquity of industrial cleaning devices, some industrial cleaning devices may be located in remote areas that may make it difficult for a technician to visit the site where the industrial cleaning device is located to complete regular maintenance tasks. These remote visits add unnecessary maintenance costs in the case of regular maintenance tasks that could be performed by personnel at the establishments using the industrial cleaning devices. These costs are borne by the owner of the establishment and/or the supplier of the industrial cleaning devices.

Therefore, a need exists for improved methods, apparatus, systems, computer program products, computing devices, computing entities, and/or the like for providing technical and/or customer support for industrial cleaning devices.

BRIEF SUMMARY

In general, embodiments of the present invention provide methods, apparatus, systems, computer program products, computing devices, computing entities, and/or the like for providing technical and/or customer support for industrial cleaning devices. For example, various embodiments provide technical and/or customer support options for training users about one or more industrial cleaning devices and/or how to perform basic and/or regular maintenance tasks, assisting a user in troubleshooting an industrial cleaning device, accessing live customer support, and/or the like. In another example, various embodiments may capture image and/or video data associated with one or more steps a user has performed and provide at least a portion of the captured image and/or video data to customer support personnel for additional troubleshooting and/or instructional assistance. In yet another example, a live video chat with a help person may be displayed concurrently with instructions for completing at least one step of a maintenance task for an industrial cleaning device via augmented reality technology.

According to one aspect of the present invention, a system for providing technical assistance for an industrial cleaning device is provided. In various embodiments, the system comprises at least one memory and at least one processor. The at least one memory may store technical assistance data associated with at least one industrial cleaning device. The at least one processor may be configured to, responsive to receiving input indicating user selection of a help option: initiate a help communication session. The at least one processor may be further configured to, responsive to receiving input indicating user selection of a training option: cause image data to be captured, the image data comprising image data associated with the industrial cleaning device; and cause display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device. Additionally and/or alternatively, the at least one processor may be further configured to, responsive to receiving input indicating user selection of a troubleshooting option: determine the status of one or more indicators associated with the industrial cleaning device; based at least in part on the status of the one or more indicators, identify a maintenance task for the industrial cleaning device; cause image data to be captured, the image data comprising image data associated with the industrial cleaning device; and cause display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through the identified maintenance task associated with the industrial cleaning device.

In various embodiments, to determine the status of the one or more indicators, the at least one processor may be configured to receive user input indicating the status of the one or more indicators. In some embodiments, to determine the status of the one or more indicators, the at least one processor is configured to cause image data to be captured of the one or more indicators associated with the industrial cleaning device; and determine the status of the one or more indicators based at least in part on the captured image data and the stored technical assistance data. In various embodiments, to initiate a help communication session, the at least one processor is configured to provide information related to the industrial cleaning device to a help system; and receive information related to completing a maintenance task. In some such embodiments, the information related to the industrial cleaning device is provided and received via at least one of a live video chat, text messages, instant messaging, and/or electronic mail. In some embodiments, the received information related to completing a maintenance task may cause image data to be captured, the image data comprising image data associated with the industrial cleaning device and may cause the display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through the maintenance task associated with the industrial cleaning device. In various embodiments, the animated instructions are scaled such that the portion of the animated instructions that relates to the portion of the industrial cleaning device is displayed at corresponding sizes. In some embodiments, the at least one processor is further configured to identify the industrial cleaning device based on at least one of received input indicating user selection of the industrial cleaning devices and/or image data associated with the industrial cleaning device. In various embodiments, the maintenance task is at least one of turning the industrial cleaning device on, changing out a chemical supply bottle, clearing a clogged hose, performing daily maintenance, and/or performing weekly maintenance. In various embodiments, the industrial cleaning device is configured to provide cleaning solution for at least one of cleaning a floor, a ware washer, and/or a commercial laundry operation. In some embodiments, the system may comprise a user computing entity, the user computing entity configured to display the animated instructions and the image data, the animated instructions displayed over the image data such that at least a portion of the animated instructions that relate to at least a portion of the industrial cleaning device is displayed over the image data associated with the portion of the industrial cleaning device. In some such embodiments, the user computing entity is at least one of a mobile computing device and a heads up display.

In another aspect of the present invention, a method for providing technical assistance for a device (e.g., an industrial cleaning device or other device) is provided. In various embodiments, the method may comprise receiving input indicating user selection of a technical support option. The method may further comprise, responsive to receiving input indicating user selection of a help option, initiating a help communication session. The method may further comprise, responsive to receiving input indicating user selection of a training, causing image data to be captured, the image data comprising image data associated with the device; and causing display of animated instructions and the image data, the animated instructions displayed over the image data such that at least a portion of the animated instructions that relate to at least a portion of the device is displayed over the image data associated with the portion of the device, the animated instructions configured to guide a user through a maintenance task associated with the device. Additionally and/or alternatively, the method may further comprise, responsive to receiving input indicating user selection of a troubleshooting option, determining the status of one or more indicators associated with the device; based at least in part on the status of the one or more indicators, identifying a maintenance task for the device; causing image data to be captured, the image data comprising image data associated with the device; and causing display of animated instructions and the image data, the animated instructions displayed over the image data such that at least a portion of the animated instructions that relate to at least a portion of the device is displayed over the image data associated with the portion of the device, the animated instructions configured to guide a user through the identified maintenance task associated with the device.

In various embodiments, determining the status of the one or more indicators comprises receiving user input indicating the status of the one or more indicators. In some embodiments, determining the status of the one or more indicators comprises: causing image data to be captured of the one or more indicators associated with the device; and determining the status of the one or more indicators based at least in part on the captured image data. In various embodiments, initiating a help communication session comprises: providing information related to the device to a help system; and receiving information related to completing a maintenance task. In some such embodiments, the information is provided and received via at least one of a live video chat, text messages, instant messaging, and/or electronic mail. In some embodiments, receiving information related to completing a maintenance task comprises: causing image data to be captured, the image data comprising image data associated with the device; and causing display of animated instructions and the image data, the animated instructions displayed over the image data such that at least a portion of the animated instructions that relate to at least a portion of the device is displayed over the image data associated with the portion of the device, the animated instructions configured to guide a user through the maintenance task associated with the device. In various embodiments, the method further comprises scaling the animated instructions such that the portion of the animated instructions that relates to the portion of the device are displayed at corresponding sizes. In some embodiments, the method further comprises identifying the device based on at least one of received input indicating user selection of the devices and/or image data associated with the device. In some embodiments, the maintenance task is at least one of turning the device on, changing out a chemical supply bottle, clearing a clogged hose, performing daily maintenance, and/or performing weekly maintenance. In various embodiments, the device is configured to provide cleaning solution for at least one of cleaning a floor, a ware washer, and/or a commercial laundry operation.

According to another aspect of the present invention, a computer program product for providing technical assistance for an industrial cleaning device is provided. The computer program product comprises at least one non-transitory computer-readable storage medium having computer-readable program code portions stored therein. In various embodiments, the computer-readable program code portions comprise: an executable portion configured to receive input indicating user selection of a technical support option and an executable portion configured to, responsive to receiving input indicating user selection of a help option, initiate a help communication session. The computer-readable program code portions may further comprise an executable portion configured to, responsive to receiving input indicating user selection of a training option, cause image data to be captured, the image data comprising image data associated with the industrial cleaning device, and cause display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device. Additionally and/or alternatively, the computer-readable code portions may further comprise an executable portion configured to, responsive to receiving input indicating user selection of a troubleshooting option, determine the status of one or more indicators associated with the industrial cleaning device, based at least in part on the status of the one or more indicators, identify a maintenance task for the industrial cleaning device, cause image data to be captured, the image data comprising image data associated with the industrial cleaning device, and causing display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through the identified maintenance task associated with the industrial cleaning device.

According to another aspect of the present invention, a system for providing technical assistance for an industrial cleaning device is provided. The system may comprise a user computing entity and a help system. The user computing entity may comprise at least one processor configured to cause the capture of image data associated with the performance of at least one step of a maintenance task associated with an industrial cleaning device; and provide at least a portion of the image data associated with the performed maintenance task to a remote help system. The help system may comprise one or more processors configured to receive the provided image data; and cause display of the provided image data. In various embodiments, the help system is remotely located with respect to the user computing entity.

In various embodiments, the user computing entity is configured to provide the at least a portion of the image data to the help system in real time or near real time. In some embodiments, the user computing entity is configured to store at least a portion of the image data in at least one memory and provide the at least a portion of the captured image data to the help system at a later point in time. In various embodiments, the help system can cause display of instructions on the user computing entity for completing at least one step of a maintenance task associated with the industrial cleaning device. In some embodiments, the display of instructions on the user computing entity comprises animated instructions for the at least one step of the maintenance task and the image data such that at least a portion of the animated instructions that relate to at least a portion of the industrial cleaning device is displayed over the image data associated with the particular portion of the industrial cleaning device, the animated instructions configured to guide a user through the at least one step of the maintenance task associated with the industrial cleaning device. In various embodiments, at least one of the user computing entity and the help system is configured to identify the industrial cleaning device based at least in part on the image data.

According to another aspect of the present invention, a method for providing technical assistance for a device (e.g., industrial cleaning device or other device) is provided. In various embodiments, the method may comprise causing, via one or more processors, the capture of image data associated with the performance of at least one step of a maintenance task associated with a device; and providing, via the one or more processors, at least a portion of the image data associated with the performed maintenance task to a remote help system.

In various embodiments, the at least a portion of the image data is provided to the remote help system in real time or near real time. In some embodiments, the method may further comprise storing at least a portion of the image data in at least one memory and providing the at least a portion of the captured image data to the help system at a later point in time. In various embodiments, the method may further comprise causing, via the help system, display of instructions for completing at least one step of a maintenance task associated with the device. In some embodiments, displaying the instructions for completing at least one step of a maintenance task comprises displaying animated instructions for the at least one step of the maintenance task and displaying the image data such that at least a portion of the animated instructions that relate to at least a portion of the device is displayed over the image data associated with the particular portion of the device, the animated instructions configured to guide a user through the at least one step of the maintenance task associated with the device. In various embodiments, the method may further comprise identifying the device based at least in part on the image data.

According to another aspect of the present invention, a computer program product for providing technical assistance for an industrial cleaning device is provided. The computer program product may comprise at least one non-transitory computer-readable storage medium having computer-readable program code portions stored therein. The computer-readable program code portions may comprise: an executable portion configured to cause the capture of image data associated with the performance of at least one step of a maintenance task associated with an industrial cleaning device; and an executable portion configured to provide at least a portion of the image data associated with the performed maintenance task to a remote help system.

In various embodiments, the at least a portion of the image data is provided to the remote help system in real time or near real time. In various embodiments, the computer-readable program code portions may further comprise an executable portion configured to store at least a portion of the image data in at least one memory; and, an executable portion configured to provide the at least a portion of the captured image data to the help system at a later point in time. In some embodiments, the computer-readable program code portions may further comprise an executable portion configured to receive input, via the help system, causing display of instructions for completing at least one step of a maintenance task associated with the industrial cleaning device. In various embodiments, displaying the instructions for completing at least one step of a maintenance task comprises displaying animated instructions for the at least one step of the maintenance task and displaying the image data such that at least a portion of the animated instructions that relate to at least a portion of the industrial cleaning device is displayed over the image data associated with the particular portion of the industrial cleaning device, the animated instructions configured to guide a user through the at least one step of the maintenance task associated with the industrial cleaning device. In some embodiments, the computer-readable program code portions may further comprise an executable portion configured to identify the industrial cleaning device based at least in part on the image data.

According to another aspect of the present invention, a system for providing technical assistance for an industrial cleaning device is provided. The system may comprise a help system and a remote user computing entity. The help system may comprise one or more processors configured to cause the capture of help image data; provide at least a portion of the help image data to a remote user computing entity; and cause display of animated instructions for performing at least one step of a maintenance task associated with the industrial cleaning device at the remote user computing entity. The user computing entity may comprise at least one processor configured to cause the capture of image data associated with the industrial cleaning device; and cause simultaneous display of at least a portion of the help image data, the animated instructions, and at least a portion of the captured image data associated with the industrial cleaning device, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device. The help system may be remotely located with respect to the remote user computing entity.

In various embodiments, the help image data is provided in real-time or near real-time. In some embodiments, the maintenance task is at least one of turning the industrial cleaning device on, changing out a chemical supply bottle, clearing a clogged hose, performing daily maintenance, and/or performing weekly maintenance. In various embodiments, the industrial cleaning device is configured to provide cleaning solution for at least one of cleaning a floor, a ware washer, and/or a commercial laundry operation. In some embodiments, at least one of the user computing entity and the help system is configured to identify the industrial cleaning device based at least in part on the image data.

According to another aspect of the present invention, a method for providing technical assistance for an industrial cleaning device is provided. In various embodiments, the method may comprise: receiving, via one or more processors, help image data; receiving, via the one or more processors, input causing the display of animated instructions for performing at least one step of a maintenance task associate with the industrial cleaning device; causing the capture of image data associated with the industrial cleaning device; and simultaneously displaying at least a portion of the help image data, the animated instructions, and at least a portion of the captured image data associated with the industrial cleaning device, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device.

In various embodiments, the help image data is provided in real-time or near real-time. In some embodiments, the maintenance task is at least one of turning the industrial cleaning device on, changing out a chemical supply bottle, clearing a clogged hose, performing daily maintenance, and/or performing weekly maintenance. In various embodiments, the industrial cleaning device is configured to provide cleaning solution for at least one of cleaning a floor, a ware washer, and/or a commercial laundry operation. In some embodiments, the method may further comprise identifying the industrial cleaning device based at least in part on the image data.

According to yet another aspect of the present invention, a computer program product for providing technical assistance for an industrial cleaning device is provided. The computer program product comprises at least one non-transitory computer-readable storage medium having computer-readable program code portions stored therein. The computer-readable program code portions comprising: an executable portion configured to receive help image data; an executable portion configured to receive input causing the display of animated instructions for performing at least one step of a maintenance task associate with the industrial cleaning device; an executable portion configured to cause the capture of image data associated with the industrial cleaning device; and an executable portion configured to simultaneously display at least a portion of the help image data, the animated instructions, and at least a portion of the captured image data associated with the industrial cleaning device, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device.

In various embodiments, the help image data is provided in real-time or near real-time. In some embodiments, the maintenance task is at least one of turning the industrial cleaning device on, changing out a chemical supply bottle, clearing a clogged hose, performing daily maintenance, and/or performing weekly maintenance. In various embodiments, the industrial cleaning device is configured to provide cleaning solution for at least one of cleaning a floor, a ware washer, and/or a commercial laundry operation. In some embodiments, the computer-readable program code portions may further comprise an executable portion configured to identify the industrial cleaning device based at least in part on the image data.

According to various embodiments, various aspects of the present invention may be utilized in the same embodiment. For example, in one embodiment a system is provided comprising at least a user computing entity and a help system. The user computing entity may comprise at least one memory and at least one processor. The at least one memory may store technical assistance data associated with at least one industrial cleaning device. The at least one processor may be configured to, responsive to receiving input indicating user selection of a help option: initiate a help communication session between the user computing entity and the help system. The at least one processor may be further configured to, responsive to receiving input indicating user selection of a training option: cause image data to be captured, the image data comprising image data associated with the industrial cleaning device; and cause display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through a maintenance task associated with the industrial cleaning device. Additionally and/or alternatively, the at least one processor may be further configured to, responsive to receiving input indicating user selection of a troubleshooting option: determine the status of one or more indicators associated with the industrial cleaning device; based at least in part on the status of the one or more indicators, identify a maintenance task for the industrial cleaning device; cause image data to be captured, the image data comprising image data associated with the industrial cleaning device; and cause display of animated instructions and the image data, the animated instructions displayed over the image data such that at least a portion of the animated instructions that relate to at least a portion of the industrial cleaning device is displayed over the image data associated with the portion of the industrial cleaning device, the animated instructions configured to guide a user through the identified maintenance task associated with the industrial cleaning device. In association with the help communication session (e.g., during the help communication session) the at least one processor of the user computing entity may be configured to cause the capture of image data associated with the performance of at least one step of a maintenance task associated with the industrial cleaning device; and provide at least a portion of the image data associated with the performed maintenance task to a help system. The help system may comprise one or more processors configured to receive the provided image data; and cause display of the provided image data. In various embodiments, the help system is remotely located with respect to the user computing entity.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
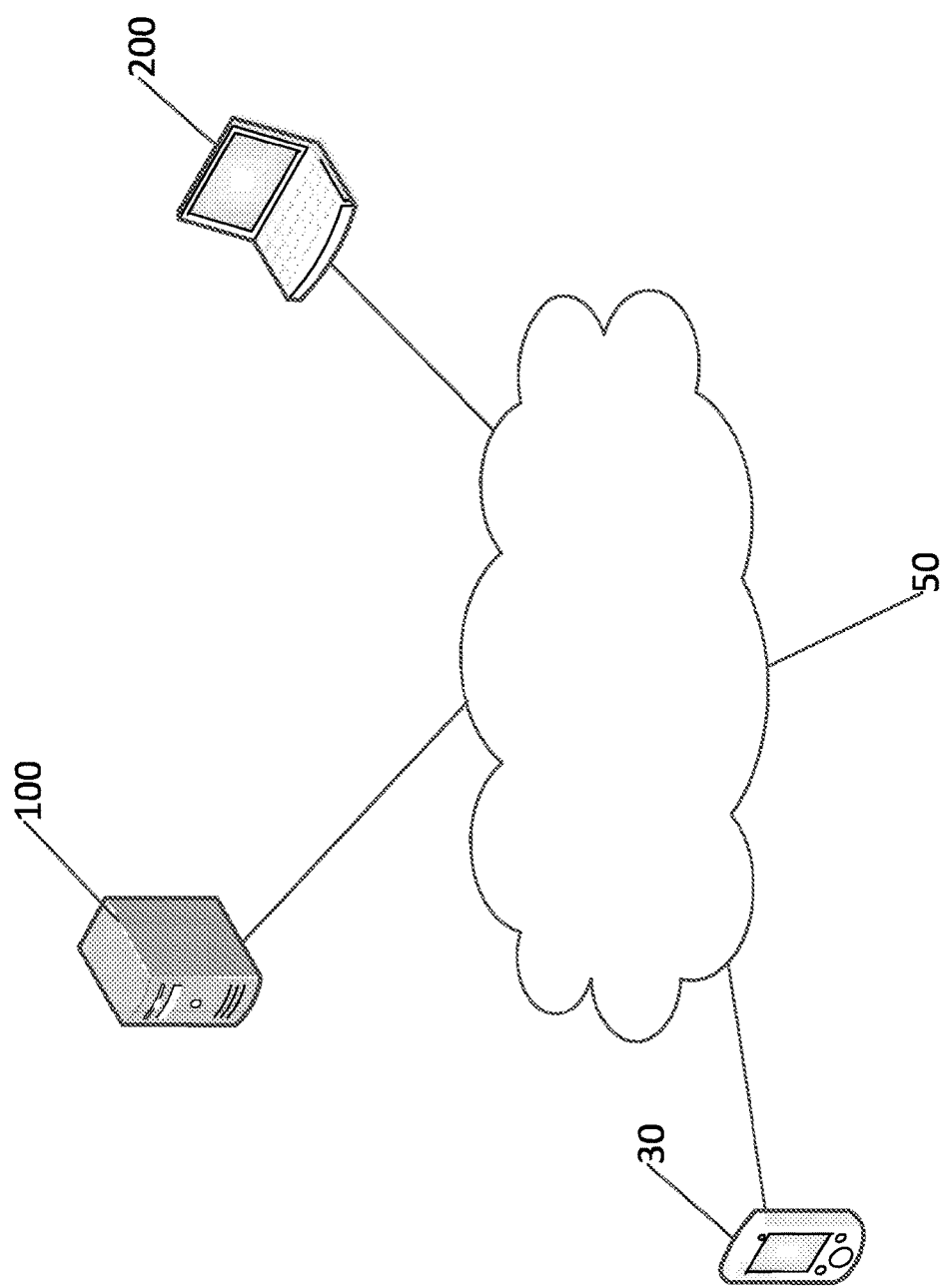
FIG. 1 illustrates one embodiment of a system for providing technical and/or customer support for one or more industrial cleaning devices, in accordance with one embodiment the present invention.

FIGS. 4, 6, 12, and 13 illustrate a flowchart of processes and operations that may be completed in accordance with one embodiment of the present invention; and FIGS. 5, 7, 8, 9, 10, and 11 provide example views of an interactive user interface in accordance with one embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. General Overview

Embodiments of the present invention provide methods, apparatus, systems, computer program products, computing devices, computing entities, and/or the like for providing technical and/or customer support for one or more industrial cleaning devices. In various embodiments, an industrial cleaning device may be a device configured to mix and/or dilute cleaning solutions including chemical cleaners, provide cleaning solution to a ware washer (such as detergents, deliming solutions and the like), provide cleaning solution for floor cleaning (such as polishes, waxes and the like), providing detergent for commercial laundry applications, performing a cleaning task, and/or the like. For example, embodiments of the present invention provide automated training and/or troubleshooting options, facilitate communication with a help person (e.g., an employee at a remote help desk and/or the like), facilitate scheduling of technician visits, monitoring of use and/or the like associated with one or more industrial cleaning devices. In various embodiments, the present invention may provide automated training and/or troubleshooting options, facilitate communication with a help person (e.g., an employee at a remote help desk and/or the like), facilitate scheduling of technician visits, monitoring of use and/or the like associated with one or more other devices such as one or more food packaging devices, one or more protective packaging devices (e.g., inflatable packaging inflator systems, and/or the like), one or more shrink packaging devices, medical supply packaging devices, and/or the like.

In one embodiment, augmented reality technology may be used to provide a user with animated instructions for completing a maintenance task associated with an industrial cleaning device. In one embodiment, the user may capture image data (still images and/or video) of the user completing one or more steps of a maintenance task associated with an industrial cleaning device. The captured image data may be displayed to a remote help person in real-time, near real-time, or at a later point in time (e.g., after a short delay, a few minutes later, a few hours later, a day or a few days later, a week later, and/or the like) to provide additional information to the help person regarding a maintenance task in progress or that has been completed by the user. In one embodiment, a remote help person may cause animated instructions for a maintenance task associated with an industrial cleaning device to be displayed to a user. In various embodiments, live video of a support person may be displayed to the user in combination with animated instructions provided via augmented reality technology.

II. Methods, Apparatus, Systems, and Computer Program Products

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like. In some embodiments, the non-volatile storage medium may be accessed remotely (e.g., via "the cloud").

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Various system architectures that may be used in accordance with the present invention will now be described herein.

III. Exemplary System Architecture

FIG. 1 illustrates one embodiment of a system that may implement the present invention. In this particular embodiment, the illustrated system may include one or more support systems 100, one or more help systems 200, and one or more user computing entities 30. The one or more support systems 100, the one or more help systems 200, and the one or more user computing entities 30 may communicate with each other and/or a variety of other computing entities via one or more wired or wireless networks, such as network 50. An example support system 100, an example user computing entity 30, and an example help system 200 will now be described in more detail below.

Exemplary Support System 100

The support system 100 may be operated by or on behalf of an organization, corporation, business, and/or the like responsible and/or interested in providing technical and/or customer support for one or more industrial cleaning devices. For example, the support system 100 may be operated by and/or on behalf of a manufacturer, retailer, and/or technician of an industrial cleaning device. In various embodiments, the support system 100 may be configured to provide one or more users with an interactive user interface configured for providing technical and/or customer support (e.g., training, troubleshooting, access to support personnel, and/or the like).

In general, the terms computing entity, network, network entity, entity, device, computing device, system, and/or similar words used herein interchangeably may refer to, for example, one or more computers, computing entities, computing devices, mobile phones, smartphones (e.g., iPhone, Android, and/or the like), gaming consoles (e.g., Xbox, Play Station, Wii), desktops, tablets, notebooks, laptops, wearable computers (e.g., glasses, heads up displays, watches, and/or the like), distributed systems, servers or server networks, blades, gateways, switches, processing devices, processing entities, relays, routers, distribution systems, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Figure 2:
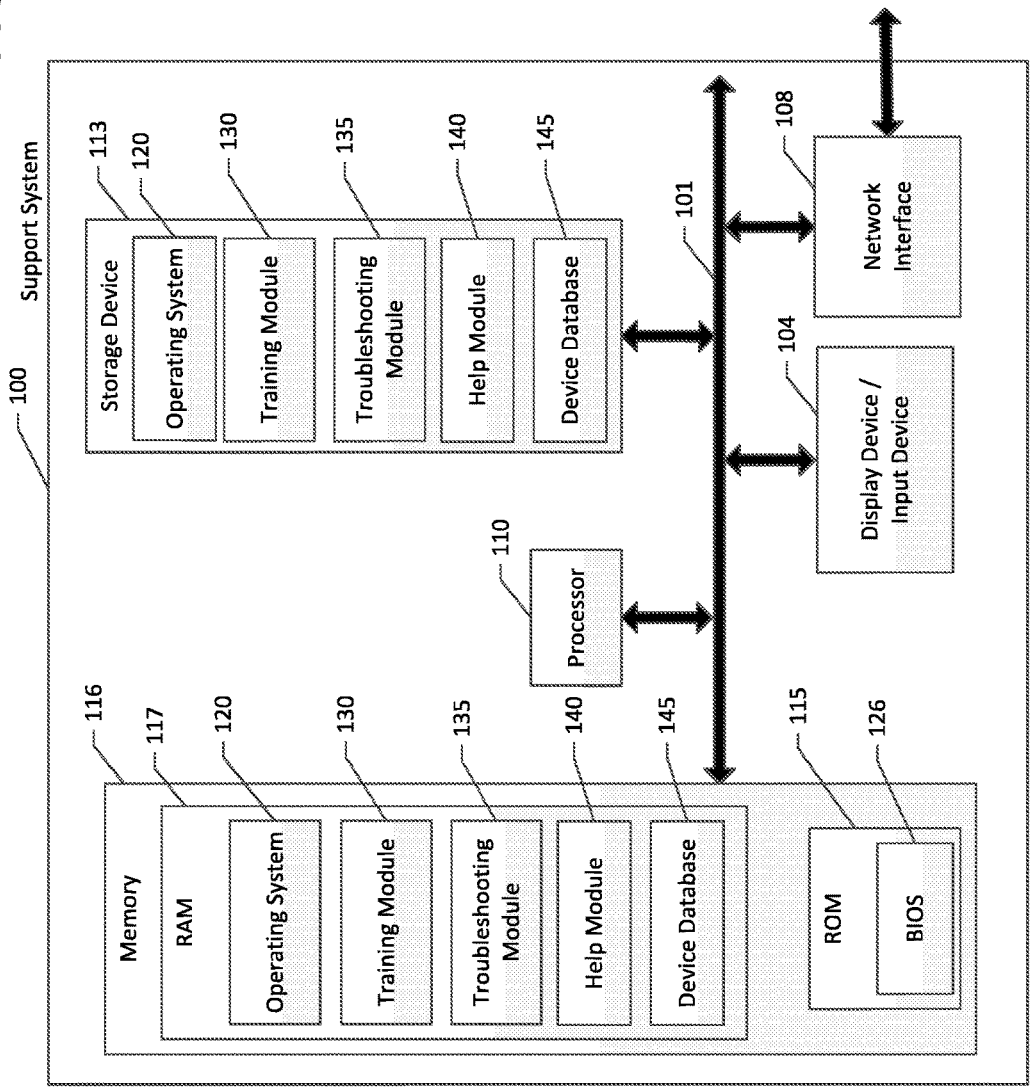
FIG. 2 is a schematic diagram of a support system, in accordance with one embodiment of the present invention.

FIG. 2 provides a schematic diagram of an example support system 100. The support system 100 comprises a processor 110, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 110 may be configured for a particular use or configured to execute instructions stored in volatile or non-volatile media or otherwise accessible to the processor 110. As such, whether configured by hardware or computer program products, or by a combination thereof, the processor 110 may be capable of performing steps or operations according to embodiments of the present invention, such as the embodiment illustrated in FIGS. 4, 6, 9, and 10, when configured accordingly. The processor 110 is used to execute software instructions for carrying out the defined steps of the method of the various embodiments of the present invention. The processor 110 communicates using a data bus 101 that is used to convey data and program instructions, typically, between the processor and memory 116.

The support system 100 further includes memory 116, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include the training module 130, troubleshooting module 135, and/or help module 140. The terms database, database instance, database management system, and/or similar terms used herein interchangeably may refer to a structured collection of records or data that is stored in a computer-readable storage medium, such as via a relational database, hierarchical database, and/or network database. Such databases may include a device database 145 configured to store technical assistance information/data, animated instructions, identifying information/data, usage information/data, and/or the like associated with one or more industrial cleaning devices.

In at least one embodiment, the support system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor 110. Thus, the databases, database instances, database management systems, data, applications, programs, program modules, scripts, source code, object code, byte code, compiled code, interpreted code, machine code, executable instructions, and/or the like may be used to control certain aspects of the operation of the support system 100 with the assistance of the processor 110 and operating system 120, training module 130, troubleshooting module 135, help module 140, and/or the like.

As indicated, a number of program modules may be stored by the non-volatile and/or volatile memory. Such program modules may include a training module 130, troubleshooting module 135, and/or help module 140. Those skilled in the art will appreciate that other modules may be present in RAM 117 to effectuate various embodiments of the present invention. Furthermore, in addition to the described modules, other modules may be used or embodiments may not be modular.

As indicated, in one embodiment, the support system 100 may also include one or more network interfaces 108 for communicating with various computing entities, such as by communicating data, content, information, and/or similar terms used herein interchangeably that can be transmitted, received, operated on, processed, displayed, stored, and/or the like. For instance, the support system 100 may be in communication with one or more user computing entities 30 via various wired or wireless networks 50. Such communication may be executed using a wired data transmission protocol, such as fiber distributed data interface (FDDI), digital subscriber line (DSL), Ethernet, asynchronous transfer mode (ATM), frame relay, DOCSIS, Programming Metadata Communication Protocol (PMCP), or any other wired transmission protocol. Similarly, the support system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, any other wireless protocol, and/or any other appropriate communications protocol. In various embodiments, the support system 100 may be configured to communicate with various computing entities to organize and facilitate completion of one or more jobs/tasks.

Various information can be input by a user (e.g., operating a user computing entity 30 or other appropriate computing entity) to the support system 100 via the network interface 108 and/or input/output device 104. This input information may include information related to an industrial cleaning device, troubleshooting information, image and/or video data, help and/or service request information, or other information. This input information may vary, however, depending on the configuration and informational requirements of the support system 100.

As mentioned above, the support system 100 also includes an input/output device 104 for receiving and displaying data. The support system 100 may include or be in communication with one or more input elements, such as a keyboard input, a mouse input, a touch screen/display input, audio input, pointing device input, joystick input, keypad input, and/or the like, as indicated by input/output device 104. The support system 100 may also include or be in communication with one or more output elements, as indicated by input/output device 104, such as audio output, video output, screen/display output, motion output, movement output, and/or the like.

The support system 100 may be configured to facilitate training a user to use and/or perform regular maintenance tasks for an industrial cleaning device (e.g., via the training module 130), assist a user in troubleshooting a problem and/or indicator light associated with an industrial cleaning device (e.g., via the troubleshooting module 135), providing a user with access to help personnel (e.g., via the help module 140), and/or the like. The support system 100 may further be configured to receive and store input related to a user profile. In various embodiments, the support system 100 may be configured to provide a user with an interactive user interface via a website, local program, mobile application, and application programming interface (API) enabled program configured to plug-in to an existing website or program. The support system 100 may be further configured to complete other tasks related to providing technical and/or customer support for an industrial cleaning device.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the support system 100 may be located remotely from other support system 100 components, such as in a distributed system. Furthermore, one or more of the components may be combined and additional components performing functions described herein may be included in the support system 100. Thus, the support system 100 can be adapted to accommodate a variety of needs and circumstances.

Exemplary User Computing Entity 30

A user computing entity 30 may be any computing entity or device configured to provide a user with access to technical and/or customer support for one or more industrial cleaning devices. In one example, a user is an employee, worker, and/or the like that may use one or more industrial cleaning devices and/or one or more devices associated with at least one industrial cleaning device. For example, the user may be a worker who makes use of a ware washer that receives cleaning solution from an industrial cleaning device. In another example, a user may be an employee, worker, and/or the like assigned to complete at least a step of one or more maintenance tasks associated with one or more industrial cleaning devices. A user computing entity 30 may include one or more components that are functionally similar to those of the support system 100. In general, the terms device, system, computing entity, entity, and/or similar words used herein interchangeably may refer to, for example, one or more computers, computing entities, desktops, mobile phones, smartphones, tablets, phablets, notebooks, laptops, distributed systems, gaming consoles (e.g., Xbox, Play Station, Wii), portable game consoles (e.g., Game Boy, Nintendo DS), watches, glasses, heads up displays, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, bridges the like, and/or any combination of devices or entities adapted to perform the functions, operations, and/or processes described herein. In one non-limiting example, the user computing entity 30 is a smartphone, tablet, or heads up display device.

Figure 3:
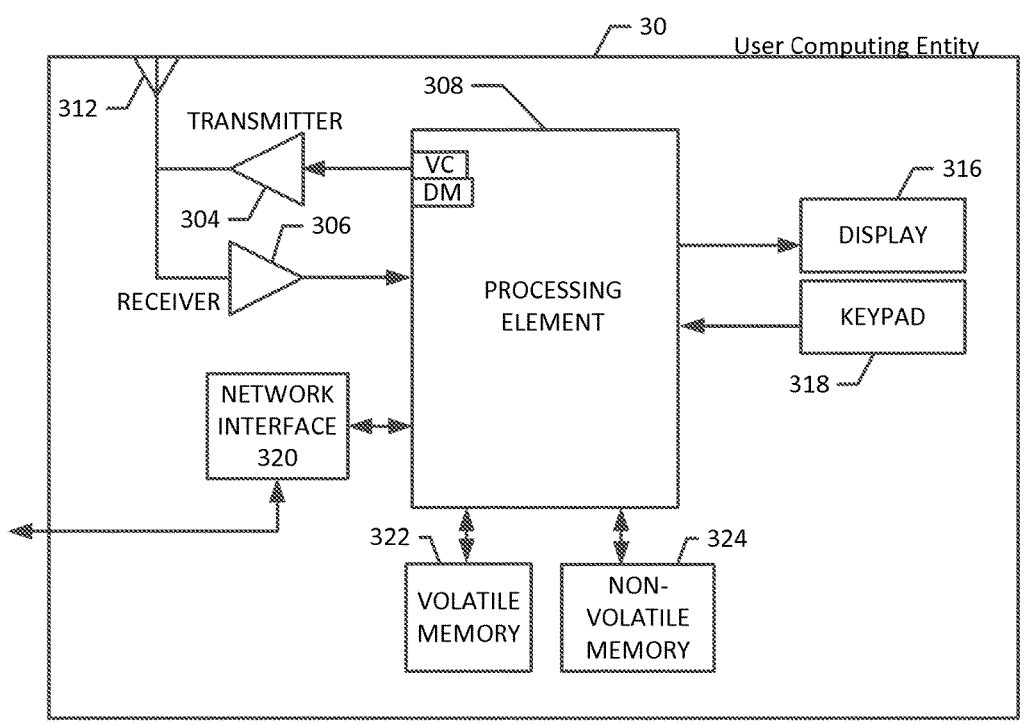
FIG. 3 is a schematic diagram of a user computing entity, in accordance with one embodiment of the present invention.

FIG. 3 provides an illustrative schematic representative of a user computing entity 30 that can be used in conjunction with embodiments of the present invention. As shown in FIG. 3, the user computing entity 30 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the support system 100. In a particular embodiment, the user computing entity 30 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, WiMAX, UWB, IR, NFC, Bluetooth, Bluetooth Lite, USB, and/or the like. Similarly, the user computing entity 30 may operate in accordance with multiple wired communication standards and protocols, such as those described above with regard to the support system 100 via a network interface 320.

Via these and/or other communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspect, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. As a non-limiting example, the location information/data can be determined by triangulating the user computing entity's 30 position in connection with a variety of other systems, including cellular towers, Wi-Fi access points, accelerometers, gyroscopes, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 30 may also comprise a user interface (that can include a display 316 coupled to a processing element 308) and/or a user input interface (coupled to a processing element 308). For example, the user interface may be a mobile application, a user application, browser, user interface, and/or similar words used herein interchangeably executing on and/or accessible via the user computing entity 30 to interact with and/or cause display of information/data from the support system 100 and/or help system 200, as described herein. The user input interface can comprise any of a number of devices allowing the user computing entity 30 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes, to enter a PIN, password, access code, initiate the user interface, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the support system 100 and/or various other computing entities. For example, a user may use the user computing entity 30 to access technical and/or customer support for one or more industrial cleaning devices.

According to various embodiments, the user computing entity 30 may also include one or more components for capturing image data, such as one or more imaging devices (not shown). An imaging device may include one or more video cameras, camcorders, still cameras, Internet-Protocol (IP) cameras, Single-Lens Reflex (SLR) cameras, high-speed cameras, and/or the like. Such imaging devices may include one or more wide angle lenses and/or one or more narrow angle lenses, one or more close-up lenses, and/or the like. In one embodiment, the imaging devices of the user computing entity 30 may also be connected to (or include) one or more network interfaces (e.g., wired or wireless) for communicating with various computing entities. This communication may be via the same or different wired or wireless networks using a variety of wired or wireless transmission protocols. This may allow the imaging devices to transmit/send images/video (e.g., image data) they capture. The imaging data captured by the imaging devices may include image data associated with an industrial cleaning device and/or the like. The resolution of the images/video (e.g., image data) captured by the imaging device may be, for instance, 640 pixels by 480 pixels or a variety of other resolutions.

In one embodiment, the image data can be captured for analysis. To do so, the image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTMLS), VP6, VP8, and/or the like. In certain embodiments, various features (e.g., text, objects of interest (e.g., image data representing an industrial cleaning device), and/or the like) can be extracted from the image data.

In another embodiment, the computing device 30 may include one or more components or functionality that are the same or similar to those of the support system 100, as described in greater detail above. As will be recognized, these architectures and descriptions are provided for exemplary purposes only and are not limiting to the various embodiments.

Exemplary Help System 200

In one embodiment, a help person may operate a help system 200. For example, the help person operating the help system may be an employee, subcontractor, or other affiliate of the organization, corporation, business, and/or the like responsible and/or interested in providing technical and/or customer support for one or more industrial cleaning devices for/by which the support system 100 is operated. For example, the help person may be an employee at a help desk associated with a company that manufactures, sells, and/or services industrial cleaning devices and/or accessories (e.g., refill bottles of cleaning chemicals, and/or the like). In various embodiments, the help person operating a help system 200 may provide remote technical and/or customer support to a user via a user computing entity 30. A help system 200 may include one or more components that are functionally similar to those of the support system 100 and/or the user computing entity 30. For example, in one embodiment, each help system 200 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. In one embodiment, a help system 200 may include an image capture device similar to the image capture device discussed above. For example, the help system 200 may communicate or interact with any number of support systems 100 and/or user computer entities 30 via their respective communication interfaces. As will be recognized, these architectures and descriptions are provided for exemplary purposes only and are not limiting to the various embodiments.

IV. Exemplary System Operation

In various embodiments, an interactive user interface is provided that facilitates providing a user with technical and/or customer support for an industrial cleaning device. In various embodiments, a user profile associated with a user may be stored and the user may access the interactive user interface by providing log-in information associated with the user's user profile. Via the user interface, a user may then access training, troubleshooting, help, and/or other options. Various aspects of the system operation will now be described herein.

Exemplary User Profile

In various embodiments, a user may be associated with a user profile. A user profile may be generated and/or otherwise set-up the first time the user accesses the interactive user interface (e.g. via a user computing entity 30), by contacting a help person (e.g., operating a help system 200), by direct entry of information to a support system 100, and/or the like. For example, a user profile may be set up for the user when the user purchases one or more industrial cleaning devices, enrolls in a service program for one or more industrial cleaning devices, contacts a help person for assistance with an industrial cleaning device or to schedule a technician visit for maintenance of one or more industrial cleaning devices, and/or the like. Once generated and/or otherwise set-up, the user profile may be stored by the support system 100 and/or by another appropriate computing device (e.g., user computing entity 30, and/or the like).

In various embodiments, the user profile may contain information related to the identity and contact information of the user. For example, the user profile may contain a name, client account number, phone number, email address, mailing address, office address, IP address associated with a user computing entity 30, and/or the like associated with the user. In various embodiments, the user profile may also contain information related to one or more industrial cleaning devices owned and/or leased by the user, the environment in which the one or more industrial cleaning devices are used, and/or the like. For example, the user profile may include a serial number, model number, model name, production date, installation date, installation location (e.g., address where device is installed, a geotag and/or geolocation information/data corresponding to the location where the device is installed, type of facility where device is installed, location within facility where device is installed, and/or the like), maintenance history, and/or the like for each industrial cleaning device associated with user profile. In various embodiments, a username and/or password may be stored in association with the user profile. In some such embodiments, the user may "login" (e.g., provide their username and/or password) to initiate and/or access the interactive user interface.

In various embodiments, a user profile may be an organization profile. For example, a company, organization, department, and/or the like associated with one or more industrial cleaning devices may establish a user profile. One or more worker profiles may then be associated with the organization profile. Each worker profile may be provided with a unique username, password, and/or other identifying/login information. This may allow information regarding which worker is accessing training tutorials, troubleshooting, help personnel, and/or the like to be tracked.

In various embodiments, the data/information stored in association with the user profile may be updated via the interactive user interface (e.g., via a user computing entity 30), by contacting a help person (e.g., operating a help system 200), and/or the like.

Exemplary Interactive User Interface

In various embodiments, an interactive user interface may be provided. For example, the support system 100 may be configured to provide a user (e.g., operating a user computing entity 30) to access an interactive user interface (e.g., a user application, a browser, a user interface, and/or similar words used herein interchangeably). The user interface may be configured to provide the user with technical and/or customer support options. For example, the user interface may be configured to provide the user (e.g., operating a user computing entity 30) with training options, troubleshooting options, help options, communication options, and/or other options. In various embodiments, a user may be asked to provide login information (e.g., a username and/or password) to access the user interface (e.g., via a user computing entity 30). In other embodiments, the support system 100 may recognize a user computing entity 30 as being associated with a particular user based on the IP address associated with the user computing entity and/or previously entered login information. In some embodiments, the user interface is provided by executable program code stored on the user computing entity 30, and no communication with the support system 100 is necessary for the user to access the interactive user interface (e.g., via the user computing entity 30).

FIGS. 4, 6, 9, and 10 provide a flowchart of operations and processes that may be completed via the interactive user interface in an embodiment of the present invention. At step 402, the user accesses the interactive user interface (e.g., via the user computing entity 30). FIG. 5 illustrates an example interactive user interface 500 displayed on an example user computing entity 30. For example, the user interface 500 may provide a user operating a user computing entity 30 with training option(s) 502, troubleshooting option(s) 504, help option(s) 506, communication option(s) 508, and/or other options (e.g., update user profile option(s) 510).

Returning to FIG. 4, at step 404, it is determined if the user has provided input via the user computing entity 30 selecting the training option 502. If it is determined that the user has selected the training option 502 via the interactive user interface 500, the user computing entity 30 continues to step 602 illustrated in FIG. 6.

At step 602, the user computing entity 30 determines the particular industrial cleaning device for which to provide training tutorials. For example, the particular industrial cleaning device may be a device configured to mix and/or dilute chemical cleaners, provide cleaning solution to a ware washer, provide cleaning solution for floor cleaning, and/or the like as discussed above. The user computing entity 30 may be configured to determine the product name, model number, serial number, and/or other identifying information associated with the particular industrial cleaning device for which the user would like to receive training. In various embodiments, the identifying information associated with the particular industrial cleaning device is determined based on information/data stored in association with a user profile, based on received input indicating a user (e.g., operating a user computing entity 30) entering information/data associated with the industrial cleaning device and/or selecting the particular industrial cleaning device from a set of possible industrial cleaning devices, and/or the like, and/or a combination thereof. For example, a particular user profile associated with a user may have information related to two different industrial cleaning devices. The interactive user interface 500 may provide the user with labeled pictures of the two industrial cleaning devices associated with the user's user profile. The user computing entity 30 may then receive input indicating a user selection of a particular industrial cleaning device from the provided industrial cleaning device options. In one embodiment, location information/data (e.g., a geotag and/or geolocation information/data) associated with one or more industrial cleaning devices may be stored by the support system 100 or the user computing entity 30 (e.g., in the device database 145, in association with one or more user profiles, and/or the like). Location information/data associated with the location of the user computing entity 30 may then be used to determine identifying information associated with the particular industrial cleaning device. In various embodiments, the user computing entity 30 may be configured to determine the particular industrial cleaning device based on captured image data. For example, the interactive user interface 500 may request that the user point the image capture device associated with the user computing entity 30 at the particular industrial cleaning device and/or a cleaning object associated with the industrial cleaning device (e.g., a ware washer associated with the particular industrial cleaning device, and/or the like). The user computing entity 30 may then cause the capture of image data associated with the particular industrial cleaning device. The user computing entity 30 may analyze at least a portion of the captured image data to determine the particular industrial cleaning device. In some such embodiments, the user computing entity 30 may analyze at least a portion of the image data and access technical assistance information/data (e.g., via device database 145, stored locally at the user computing entity 30, and/or the like) associated with the industrial cleaning devices associated with the user's user profile or a list of supported industrial cleaning devices, or the like to determine the particular industrial cleaning device. For example, information/data associated with an industrial cleaning device catalog may be used to identify and/or determine the make, model, and/or the like of the particular industrial cleaning device. In one embodiment, a room mapping application may be used and the user computing entity 30 and/or the support system 100 may be able to determine identifying information for a particular industrial cleaning device based on geographical location information/data and/or image data captured within the room where the industrial cleaning device is located. It should be understood that a variety of methods for determining and/or identifying the particular industrial cleaning device may be used as appropriate for various applications.

Figure 7:
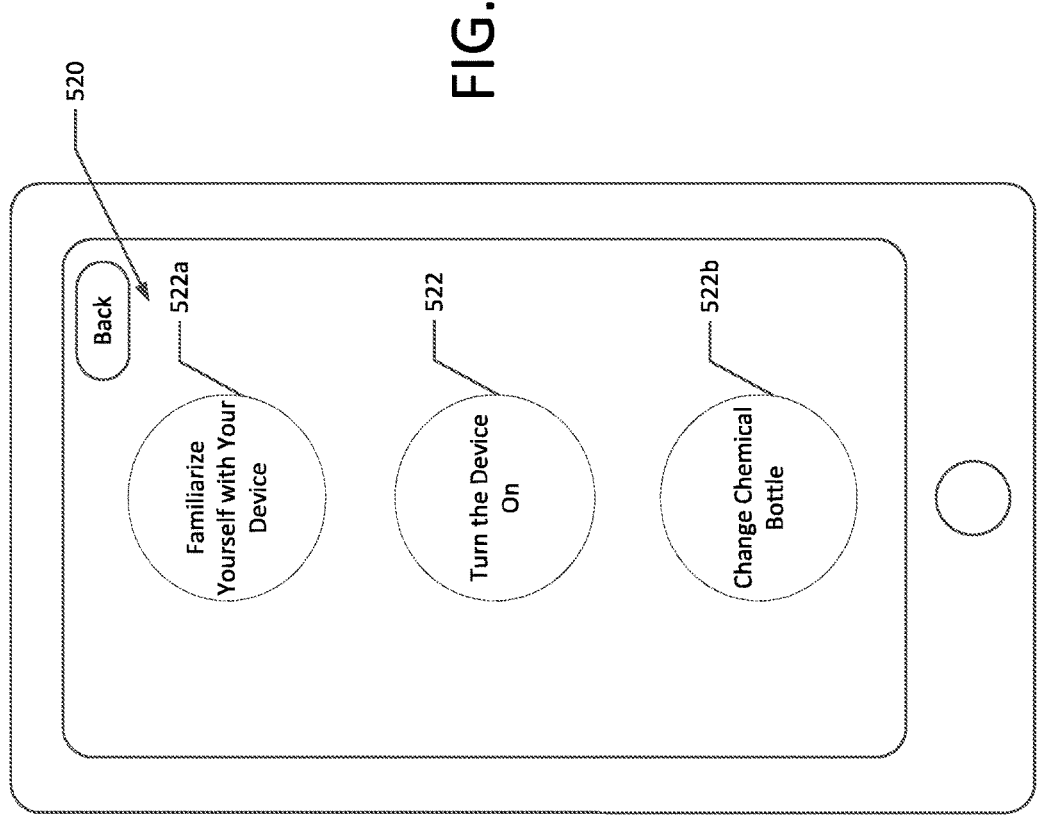

At step 604, after determining the particular industrial cleaning device for which training tutorials are to be provided, or perhaps in response thereto, the interactive user interface may display (e.g., via the user computing entity 30) a tutorial selection view 520. An example tutorial selection view 520 is illustrated in FIG. 7. The tutorial selection view 520 may provide the user with one or more training tutorials (e.g., 522, 522a, 522b) related to the particular industrial cleaning device. For example, the user may select a training tutorial 522a configured to provide the user with a basic overview of and/or familiarity with the particular industrial cleaning device, a tutorial 522 to illustrate how to turn the particular industrial cleaning device on, one or more tutorials to illustrate how to perform basic maintenance tasks associated with the particular industrial cleaning device (e.g., a tutorial 522b to illustrate changing out a chemical supply bottle, clearing a clogged hose, performing daily and/or weekly maintenance, and/or the like). In one embodiment, a user (e.g., operating a user computing entity 30) may enter a search term to search for training tutorials 522 related to a particular search term.

Returning to FIG. 6, at step 606, the user computing entity 30 receives the user selection of a training tutorial 522. At step 608, the user computing entity 30 may request that the user point the image capture device associated with the user computing entity 30 at the particular industrial cleaning device and may cause the capture of image data associated with the particular industrial cleaning device. At step 610, the user computing entity 30 may cause the simultaneous display of animated instructions for the selected training tutorial 522 and at least a portion of the captured image data. The animated instructions and the captured image data may be displayed such that the animated instructions are overlaid on the displayed image data such that portions of the animated instructions that are associated with portions of the particular industrial cleaning device are displayed at the appropriate location with respect to the displayed image data. In various embodiments, the training tutorials may be stored locally by the user computing entity 30 and/or may be requested and/or received from the support system 100.

Figure 8:
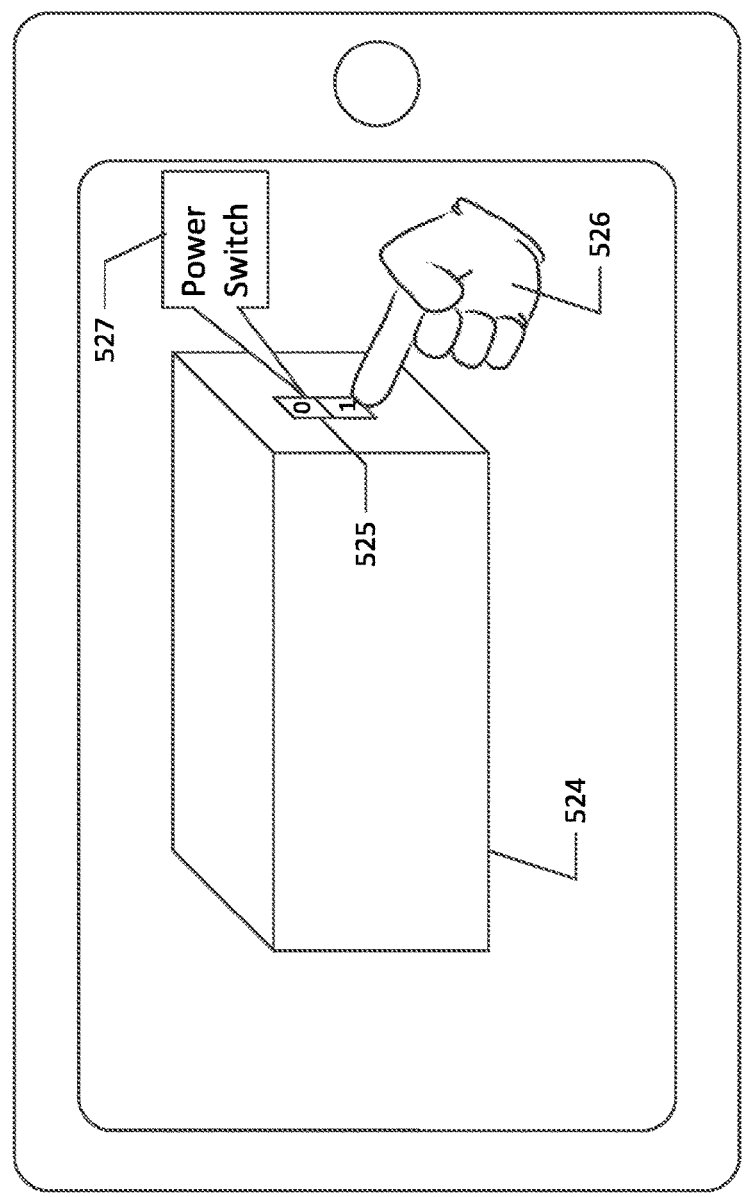

FIG. 8 provides an example of a training tutorial 522 related to how to turn on a particular industrial cleaning device. The user computing entity 30 may cause at least a portion of captured image data related to the particular industrial cleaning device 524 to be displayed. The user computing entity 30 may also cause the display of an animated hand 526 pressing the power switch 525 of the particular industrial cleaning device. For example, the animated hand 526 may appear to be pressing the power switch 525 as illustrated by the displayed image data of the particular industrial cleaning device 524. In various embodiments, the training tutorial 522 may also display one or more labels 527 configured to label a portion of the particular industrial cleaning device 524 (e.g., the power switch 525), a bottle of cleaning chemicals associated with the particular industrial cleaning device 524, and/or the like.

Figure 9:
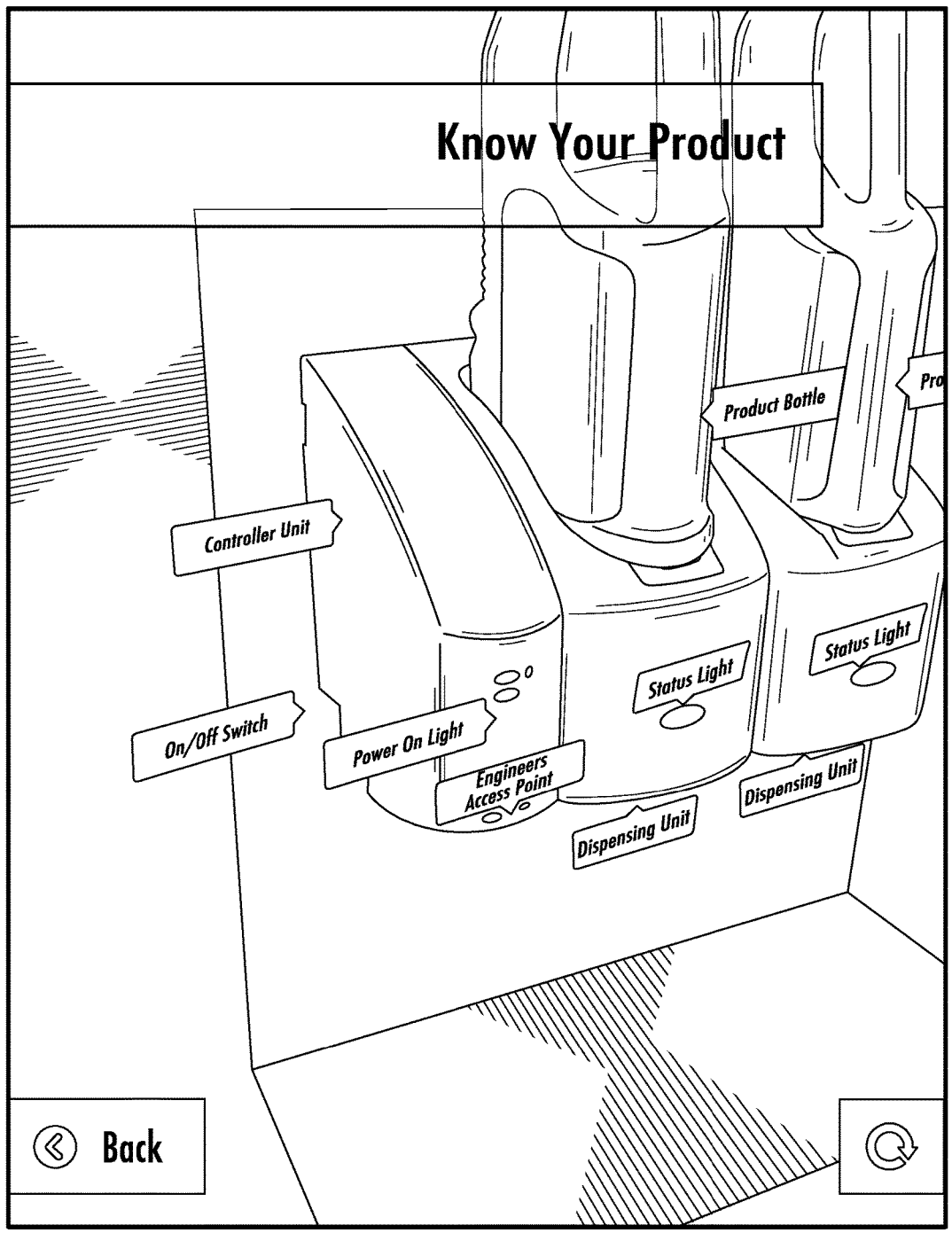
Figure 10:
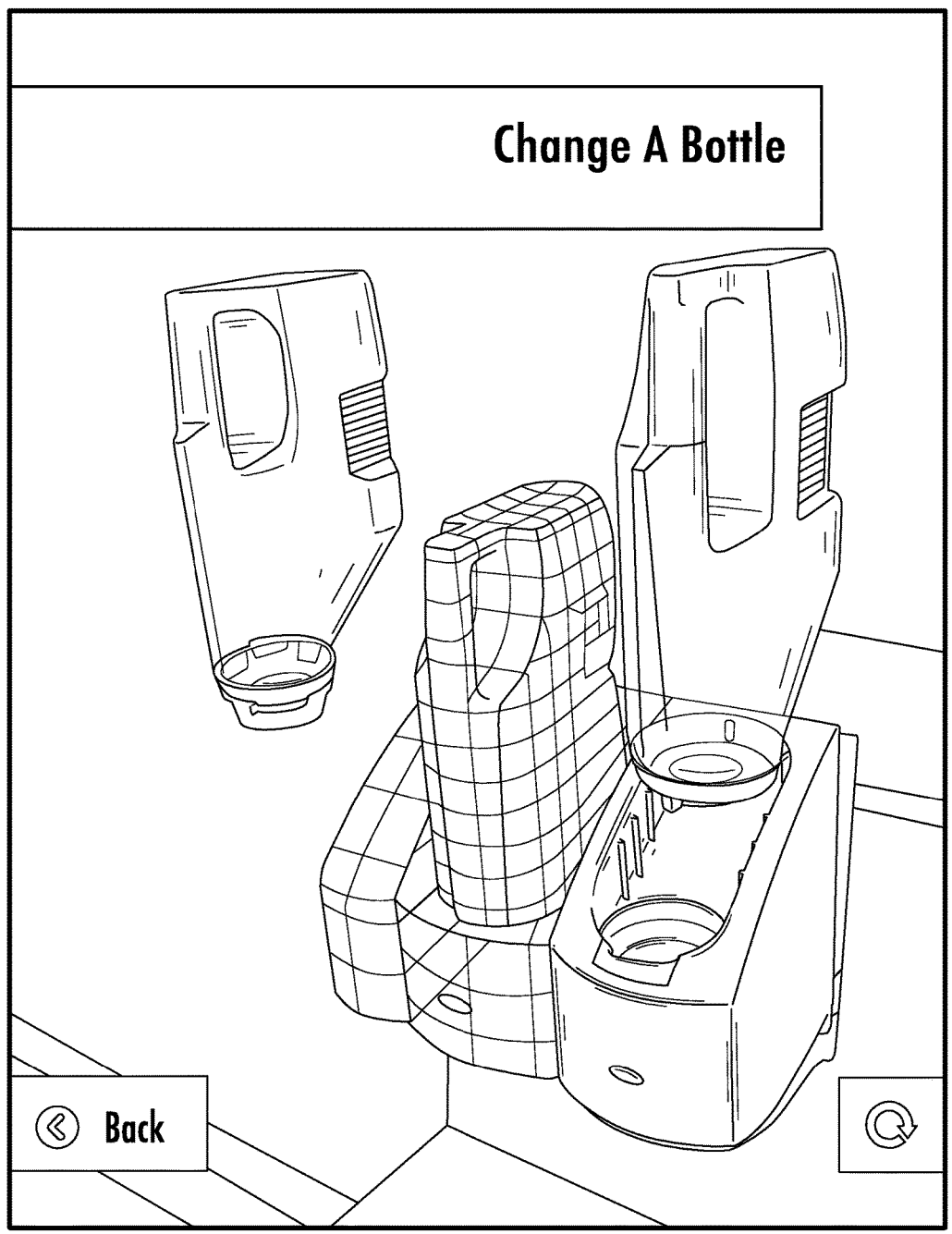
Figure 11:
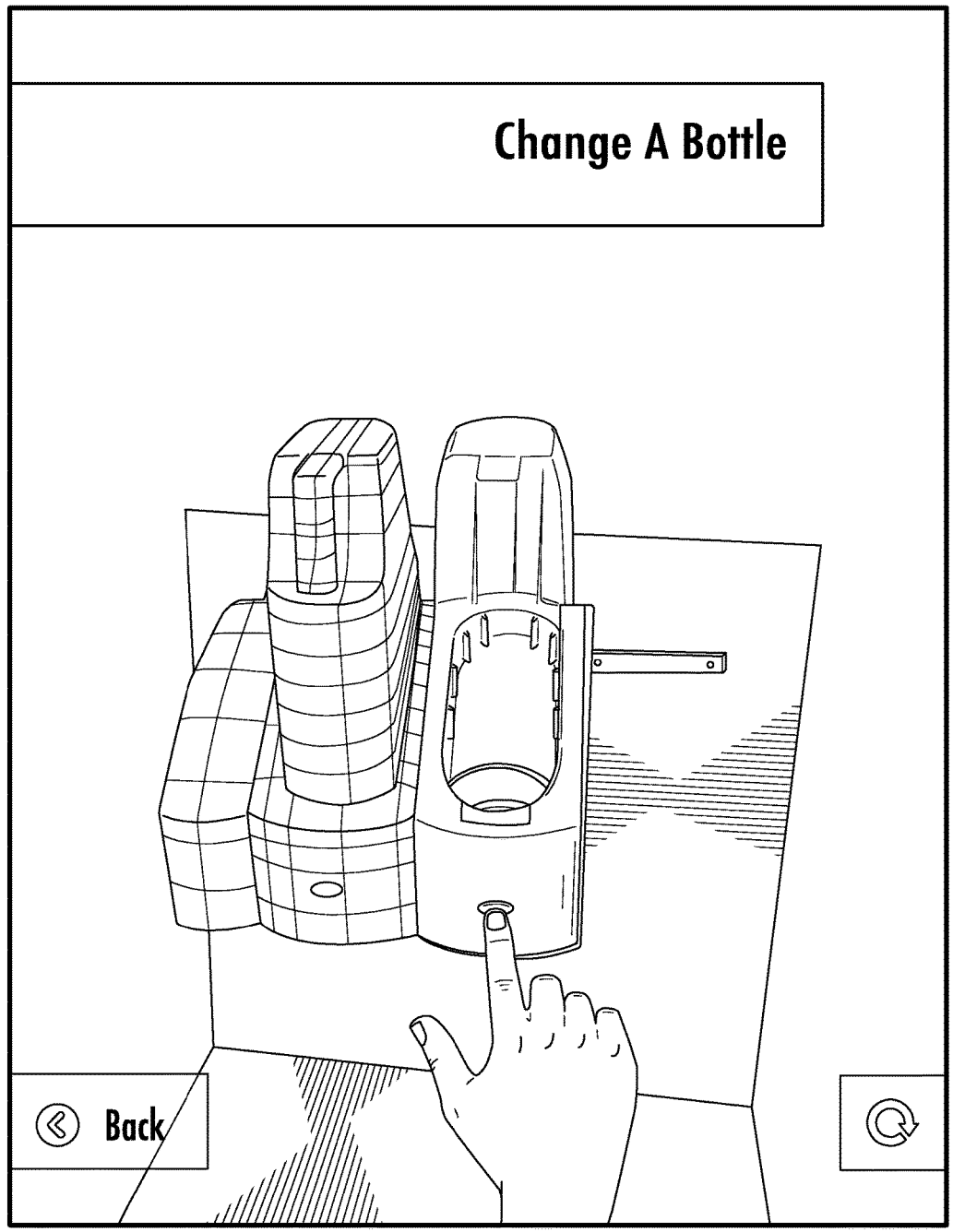

FIGS. 9-11 provide additional examples of views of the interactive interface providing at least a portion of a training tutorial (e.g., 522a, 522b) via the user computing entity 30. In particular, FIG. 9 illustrates an example view of an interactive interface providing at least a portion of the training module 522a via the user computing entity 30. At least a portion of the captured image data is displayed and various parts of the industrial cleaning device are labeled via one or more labels. The illustrated view of the interactive user interface view also includes a title for the tutorial, a back button, and a repeat/replay button that may be configured to cause the tutorial to begin from the beginning, repeat/replay the last step of the tutorial, and/or the like, depending on the application. FIGS. 10 and 11 illustrate example views of the interactive user interface providing various steps of the training tutorial 522b via the user computing entity 30. For example, FIG. 10 illustrates the step of appropriately placing a new chemical supply bottle in the industrial cleaning device and FIG. 11 illustrates the step of pressing a status light/button and/or reset button that may cause the industrial cleaning device to check the status of the chemical supply bottle, identify that a new chemical supply bottle has been provided, and/or the like.

Some training tutorials 522 may only include one step, while other training tutorials may include multiple steps, as appropriate for the task associated with the training tutorial. In various embodiments, the user operating the user computing entity 30 may provide input indicating the user is ready for the next step of the training tutorial 522 to be displayed, may request to go back a step, may indicate that the user is done with the training tutorial, and/or the like. In various embodiments, the information/data associated with user completion of a training tutorial 522 may be stored in association with the user's user profile. After completing and/or closing the training tutorial 522, the user may provide input requesting to return to the training tutorial selection view 520, the main screen of the interactive user interface 500, and/or the like. If the user requests to return to the training tutorial selection view 520, the process may return to step 604. If the user requests to return to the main screen of the interactive user interface 500, the process may return to step 404.

Returning to FIG. 4, if the user computing entity 30 determines at step 404 that input indicating user selection of a training option 502 was not received, the process continues to step 406. At step 406, the user computing entity 30 determines if input indicating user selection of a troubleshooting option 504 was received. If the user computing entity determines that input indicating user selection of a troubleshooting option 504 has been received, then the process continues to step 902, shown in FIG. 12.

At step 902, the user computing entity 30 determines the particular industrial cleaning device for which to provide troubleshooting. For example, the particular industrial cleaning device may be a device configured to mix and/or dilute chemical cleaners, provide cleaning solution to a ware washer, provide cleaning solution for floor cleaning, and/or the like as discussed above. The user computing entity 30 may be configured to determine the product name, model number, serial number, and/or other identifying information associated with the particular industrial cleaning device for which the user would like to receive training. In various embodiments, the identifying information associated with the particular industrial cleaning device is determined based on information/data stored in association with a user profile, based on received input indicating a user (e.g., operating a user computing entity 30) entering information/data associated with the industrial cleaning device and/or selecting the particular industrial cleaning device from a set of possible industrial cleaning devices, and/or the like, and/or a combination thereof. For example, a particular user profile associated with a user may have information related to two different industrial cleaning devices. The interactive user interface 500 may provide the user with labeled pictures of the two industrial cleaning devices associated with the user's user profile. The user computing entity 30 may then receive input indicating a user selection of a particular industrial cleaning device from the provided industrial cleaning device options.

In one embodiment, location information/data (e.g., a geotag and/or geolocation information/data) associated with one or more industrial cleaning devices may be stored by the support system 100 or the user computing entity 30 (e.g., in the device database 145, in association with one or more user profiles, and/or the like). Location information/data associated with the location of the user computing entity 30 may then be used to determine identifying information associated with the particular industrial cleaning device.

In various embodiments, the user computing entity 30 may be configured to determine the particular industrial cleaning device based on captured image data. For example, the interactive user interface 500 may request that the user point the image capture device associated with the user computing entity 30 at the particular industrial cleaning device and/or a cleaning object associated with the industrial cleaning device (e.g., a ware washer associated with the particular industrial cleaning device, and/or the like). The user computing entity 30 may then cause the capture of image data associated with the particular industrial cleaning device. The user computing entity 30 may analyze at least a portion of the captured image data to determine the particular industrial cleaning device. In some such embodiments, the user computing entity 30 may analyze at least a portion of the image data and access technical assistance information/data (e.g., via device database 145, stored locally at the user computing entity 30, and/or the like) associated with the industrial cleaning devices associated with the user's user profile or a list of supported industrial cleaning devices, or the like to determine the particular industrial cleaning device. For example, information/data associated with an industrial cleaning device catalog may be used to identify and/or determine the make, model, and/or the like of the particular industrial cleaning device. In one embodiment, a room mapping application may be used and the user computing entity 30 and/or the support system 100 may be able to determine identifying information for a particular industrial cleaning device based on geographical location information/data and/or image data captured within the room where the industrial cleaning device is located. It should be understood that a variety of methods for determining and/or identifying the particular industrial cleaning device may be used as appropriate for various applications.

At step 904, the user computing entity 30 may be configured to determine the status of one or more indicators associated with the particular industrial cleaning device. For example, the industrial cleaning device may be associated with one or more indicators (e.g., lights or other visual indicators, audible indicators, an indicator message communicated to the user computing entity 30 or support system 100 via a wired or wireless network, and/or the like). In one example, the industrial cleaning device may have a light emitting diode (LED) indicator light associated therewith. The color of the indicator light may indicate the status of the indicator. In another example, a cleaning device may have four indicator lights with each light configured to indicate a status of a particular element of the industrial cleaning device. Various indicators may indicate that a chemical supply bottle is empty and/or nearly empty and should be replaced, that a hose is clogged, that the device is turned on and/or connected to a power supply, that there is an issue with the water supply to the particular industrial cleaning device, maintenance tasks that should be performed, other issues or problems associated with the particular cleaning device, and/or the like.

In one embodiment, the industrial cleaning device may be in communication with the user computing entity 30 via one or more wired or wireless networks (e.g., network 50) and may provide information/data related to the status of one or more indicators to the user computing entity 30 via the network. In another embodiment, the industrial cleaning device may be in communication with the support system 100 via one or more wired or wireless networks (e.g., network 50) and provide information/data related to the status of one or more indicators to the support system via the network. In such an embodiment, the support system 100 may be configured to provide information/data related to the status of one or more indicators to the user computing entity 30, to store the information/data related to the status of the one or more indicators in association with an appropriate user profile, and/or the like.

In various embodiments, the user computing entity 30 may be configured to determine the status of the one or more indicators based on received input from a user providing input regarding the status of the one or more indicators or selecting one of a plurality of provided status options. For example, a particular industrial cleaning device may have one indicator light that may emit in five different colors, each color indicating a different status of the device. Based on the indicators associated with the particular industrial cleaning device, the user may then be provided (e.g., via the interactive user interface operating on the user computing entity 30) with five options, each option pertaining to a different color of the indicator. The user may then provide input selecting one of the provided options. In various embodiments, the user computing entity 30 may be configured to determine the status of one or more indicators associated with the particular industrial cleaning device based on captured image data. For example, the interactive user interface 500 may request that the user point the image capture device associated with the user computing entity 30 at the particular industrial cleaning device. The user computing entity 30 may then cause the capture of image data associated with the particular industrial cleaning device and the one or more indicators associated therewith. The user computing entity 30 may analyze at least a portion of the captured image data to determine the status of the one or more indicators associated with the particular industrial cleaning device. For example, the user computing entity 30 may access technical assistance information/data associated with the particular industrial cleaning device (e.g., via the device database 145 and/or the like) to determine the status of one or more indicators associated with the particular industrial cleaning device.

At step 906, after determining the status of the one or more indicators associated with the particular industrial cleaning device, or perhaps in response thereto, the user computing entity 30 determines a maintenance task based on the determined status of the one or more indicators. Technical assistance information/data associated with the particular industrial cleaning device may be accessed (e.g., via the device database 145, stored locally at the user computing entity 30, and/or the like) to identify and/or determine one or more maintenance tasks associated with a determined status of the one or more indicators. For example, if a particular indicator light is green, it may indicate that associated industrial cleaning device is turned on and has power. Thus, if it is determined that the status of that particular indicator light is that the light is not illuminated, the user computing entity 30 may determine that the appropriate maintenance task is to turn the industrial cleaning device on. In another example, if it is determined that the status of the one or more indicators indicates that a chemical supply bottle is empty or nearly empty and should be replaced, the user computing entity 30 may determine that the appropriate maintenance task may be to change the chemical supply bottle. In yet another example, if it is determined that the status of the one or more indicators indicates that a hose is clogged, the user computing entity 30 may determine the appropriate maintenance task may be to unclog the hose. It should be understood that a variety of maintenance tasks may be identified based on the status of one or more indicators as appropriate for the application.

At step 908, the user computing entity 30 may request that the user point the image capture device associated with the user computing entity 30 at the particular industrial cleaning device and may cause the capture of image data associated with the particular industrial cleaning device. At step 910, the user computing entity 30 may cause the simultaneous display of animated instructions for the maintenance task identified in step 906 and at least a portion of the captured image data. The animated instructions and the captured image data may be displayed such that the animated instructions are overlaid on the displayed image data such that portions of the animated instructions that are associated with portions of the particular industrial cleaning device are displayed at the appropriate location with respect to the displayed image data, as illustrated in FIG. 8. In various embodiments, the animated instructions may be stored locally by the user computing entity 30 and/or may be requested and/or received from the support system 100.

Some maintenance task instructions may only include one step, while other maintenance task instructions may include multiple steps, as appropriate for the task. In various embodiments, the user operating the user computing entity 30 may provide input indicating the user is ready for the next step of the instructions to be displayed, may request to go back a step, may indicate that the user is done with the instructions, may request the instructions re-begin from the beginning, and/or the like. After completing and/or closing the maintenance task instructions, the user may provide input indicating a change in the indicator status, that the issue has been resolved, that the issue has not been resolved, and/or the like. In some embodiments, image data may be captured to determine if the status of one or more indicators has changed or whether the issue has been resolved. If the status of the indicator light has changed, the user computing entity 30 may determine if another maintenance task needs to be completed or not. If another maintenance task needs to be completed and/or the issue has not been resolved, the process may return to step 906. If the issue has not been resolved, the user computing entity 30 may determine that the particular industrial cleaning device needs to be serviced by a technician and may initiate communication with a help system 200 or may otherwise facilitate scheduling a technician to service the particular industrial cleaning device. If no other maintenance task needs to be completed and/or the issue has been resolved, the process may return to step 406.

In various embodiments, the user computing entity 30 may be configured to provide troubleshooting information/data to support system 100. For example, in some embodiments, the user computing entity 30 may provide the support system 100 with information/data related to the status of the one or more indicators. In various embodiments, the user computing entity 30 may provide the support system 100 with information/data related to the maintenance task performed by the user, if the performance of the maintenance task was successful (e.g., the status of the indicator changed, the issue was resolved, and/or the like), if a technician visit was scheduled, usage information related to the industrial cleaning device, and/or other information/data related to the industrial cleaning device.

Returning to FIG. 4, if the user computing entity 30 determines at step 406 that input indicating user selection of a troubleshooting option 504 was not received, the process continues to step 408. At step 408, the user computing entity 30 determines if input indicating user selection of a help option 506 was received. If the user computing entity determines that input indicating user selection of a help option 506 has been received, then the process continues to step 1002, shown in FIG. 13.

At step 1002, the user computing entity 30 establishes communication with a help system 200. For example, communication between a user computing entity 30 and a help system 200 may be configured to allow a user operating the user computing entity 30 to communicate with a help person operating the help system 200. The user (e.g., operating a user computing entity 30) and the help person (e.g., operating a help system 200) may communicate via a video chat, a voice chat (e.g., via wired or wireless telephone, voice over IP (VOIP), and/or the like), instant messaging, text messaging, email, and/or the like. For example, the help system 200 may capture help image data and provide the help image data to the user computing entity 30. The user computing entity 30 may cause display of at least a portion of the help image data. The user computing entity 30 may also cause the capture of image data and provide at least a portion of the image data to the help system 200, thus enabling a video chat between the user (e.g., operating the user computing entity 30) and the help person (e.g., operating the help system 200). In various embodiments, the communication between the user computing entity 30 and the help system 200 may be facilitated by the support system 100. In various embodiments, the user computing entity 30 may be configured to determine and/or identify the particular industrial cleaning device, the status of one or more indicators associated with the particular industrial cleaning device, information/data associated with one or more completed maintenance tasks for the particular industrial cleaning device, and/or the like and provide such information/data to the help system 200 (possibly via the support system 100).

At step 1004, the user computing entity 30 may determine if input indicating a request to record a task session has been received. For example, the user operating the user computing entity 30 and/or the help person operating the help system 200 may provide input indicating a request to record a task session. For example, the user and/or help person may wish to record the user performing one or more steps of a maintenance task so that the help person may view the user performing the maintenance task and may provide troubleshooting and/or other assistance.

If at step 1004 it is determined that a request to record a task session has not been received, the process may continue to step 1006. At step 1006 the user computing entity 30, the help system 200, and/or the support system 100 may facilitate a help session between a user operating a user computing entity 30 and a help person operating a help system 200. For example, the help person may provide troubleshooting, technical, and/or other assistance to the user via the help session. In various embodiments, the help person (e.g., operating the help system 200) may be able to cause the user computing entity 30 to display animated instructions associated with one or more maintenance tasks. In some such embodiments, the animated instructions may be displayed simultaneously with captured image data, as illustrated in FIG. 8 and discussed above.

If at step 1004, it is determined that a request to record a task session was received, then the process continues to step 1008. At step 1008, the user is instructed to direct the image capture device associated with the user computing entity 30 at the industrial cleaning device and image data associated with the user completing one or more steps of a maintenance task associated with the particular industrial cleaning device is captured. The image data may be, for example, a sequence of still photos of each step of the maintenance task, and/or a video recording of the steps taken. In various embodiments at least a portion of the captured image data associated with the task session is stored in memory local to the user computing entity 30 (e.g., volatile memory 322 and/or non-volatile memory 324) and/or saved to memory associated with the support system 100 (e.g., memory 116 and/or storage device 113).

At step 1010, at least a portion of the stored image data associated with the task session is provided to the help system 200. In some embodiments, the portion of the stored image data associated with the task session is provided to the help system 200 in real-time or near real-time. In some embodiments, the image data associated with the task session is provided to the help system 200 after a delay (e.g., after completion of each step, the image data associated with that step may be provided to the help system 200; after completion of the task and/or multiple steps of the task, the image data associated with the task and/or the multiple steps of the task may be provided to the help system 200; and/or the like). In various embodiments, the image data associated with the task is not stored by the user computing entity 30 and/or support system 100 after the image data is provided to the help system 200. In other embodiments, the user computing entity 30 and/or support system 100 may save the image data for later use. It should be understood that a variety of methods for storing and providing the image data to the help system 200 may be used in various applications.

In various embodiments, a user operating a user computing entity 30 may request to record a task session before a communication session is established with the help system 200. In such a case, image data associated with a task session may be captured and at least a portion thereof saved to memory local to the user computing entity 30 (e.g., volatile memory 322 and/or non-volatile memory 324) and/or saved to memory associated with the support system 100 (e.g., memory 116 and/or storage device 113). The user computing entity 30 and/or the support system 100 may then provide at least a portion of the saved image data to the help system 200 after and/or in response to the establishment of a communication session between a user computing entity 30 and a help system 200; after and/or in response to a user (e.g., operating a user computing entity) requesting the saved image data be provided to the help system 200; after and/or in response to a help person (e.g., operating a help system 200) requesting the saved image data be provided to the help system 200; and/or the like. In various embodiments, image data associated with one or more maintenance tasks associated with an industrial cleaning device may be regularly captured so that if an issue arises the captured image data may be available for troubleshooting the issue.

At step 1012, the user (e.g., operating the user computing entity 30) may receive feedback from the help person (e.g., operating the help system 200). The feedback may be based on the image data provided to the help system 200. For example, the help person (e.g., operating the help system 200) may provide additional information regarding the task and/or one or more steps of the task, troubleshooting assistance, technical assistance, and/or other assistance to the user operating the user computing entity 30. In various embodiments, the help person (e.g., operating the help system 200) may be able to cause the user computing entity 30 to display animated instructions associated with one or more maintenance tasks and/or one or more steps of a maintenance task. In some such embodiments, the animated instructions may be displayed simultaneously with captured image data, as illustrated in FIG. 8 and discussed above.

As noted above, in various embodiments, the user may request a task session to be recorded before communication with a help system 200 is established. For example, a user operating the user computing entity 30 may request that image data be captured of the user completing one or more steps of a maintenance task associated with a particular industrial cleaning device. Image data of the user completing the one or more steps of the maintenance task may then be captured and at least a portion thereof stored. If the user becomes stuck, unsure of the next step, and/or does not achieve the desired outcome, the user may then request that a help session be established (e.g., that communication between the user computing entity 30 and a help system 200 be established). At least a portion of the stored image data associated with the user performing the one or more steps of the maintenance task may be provided to the help system 200 and displayed to a help person (e.g., operating the help system 200). Image data associated with any steps attempted and/or completed by the user during the help session may be captured and provided to the help system 200 in real-time or near real-time. After the help session is completed and/or closed, the process may return to step 408.

Returning to FIG. 4, if the user computing entity 30 determines at step 408 that input indicating user selection of the help option 506 was not received, the process continues to step 410. At step 410, the user computing entity 30 determines if input indicating user selection of a communication option 508 was received. If the user computing entity determines that input indicating user selection of a communication option 508 has been received, then the process continues to step 412.

At step 412, the user computing entity 30 provides access to a communication portal. In the example interactive user interface shown in FIG. 5, the communication portal is an inbox configured for receiving messages. For example, the communication portal may facilitate the user sending and/or receiving messages related to scheduling technician visits, information related to the industrial cleaning devices associated with the user's user profile, information regarding new products that may be of interest to the user, information regarding refill products (e.g., refill bottles of chemical cleaner and/or the like) and/or the like. Messages associated with one or more help sessions may also be sent and/or received via the communication portal (e.g., a record of a help session, a feedback survey for a help session, and/or the like). In various embodiments, the communication portal may also provide a calendar recording past and future scheduled technician visits, when bottles of a particular chemical cleaner have been replaced and/or are expected to need to be replaced, dates of past maintenance tasks were completed, and/or the like.

When a user has finished accessing the communication portal, the user may provide input (e.g., via the user computing entity 30) causing the interactive user interface to return to the main screen of the interactive user interface 500 and the process to return to step 410.

Figure 4:
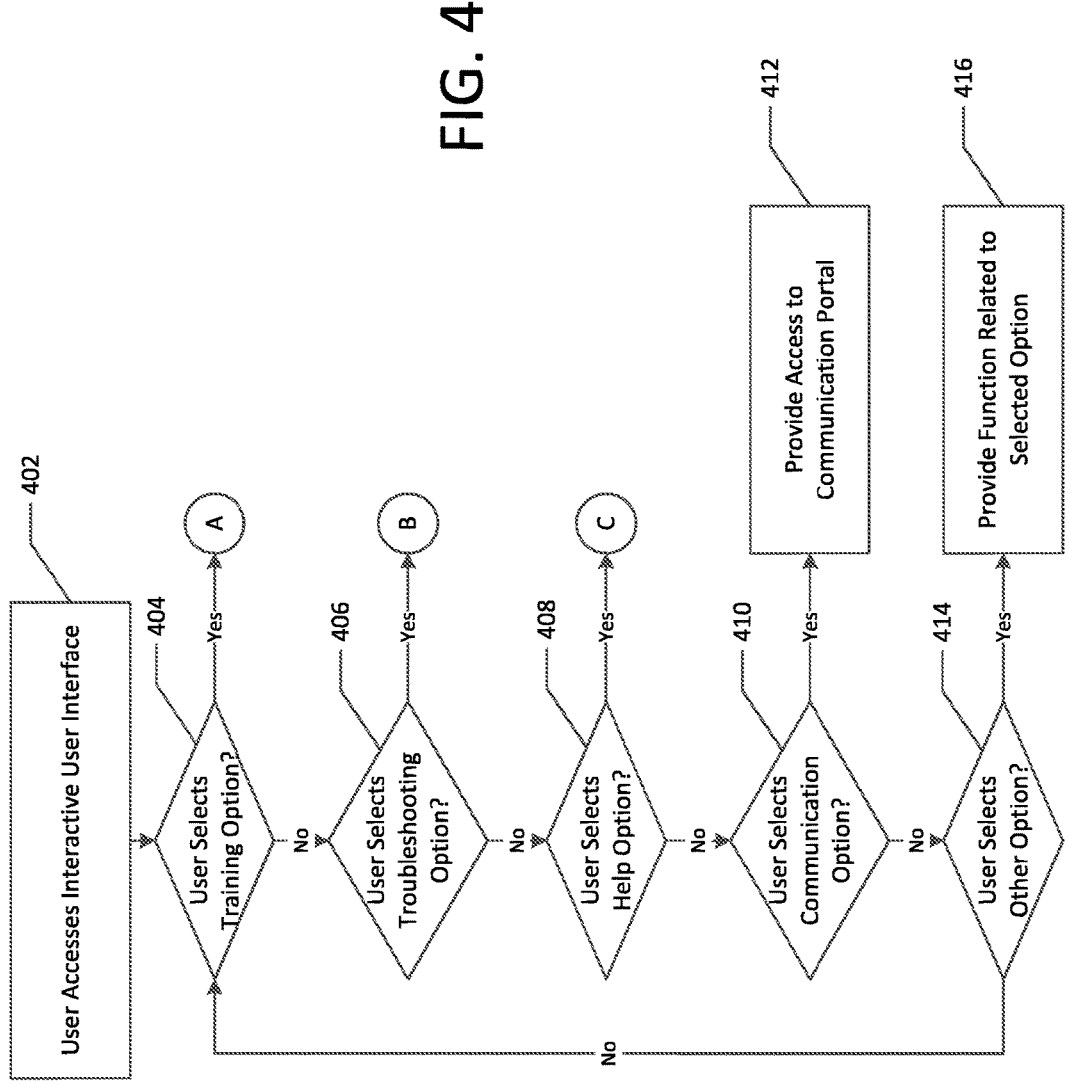
Figure 5:
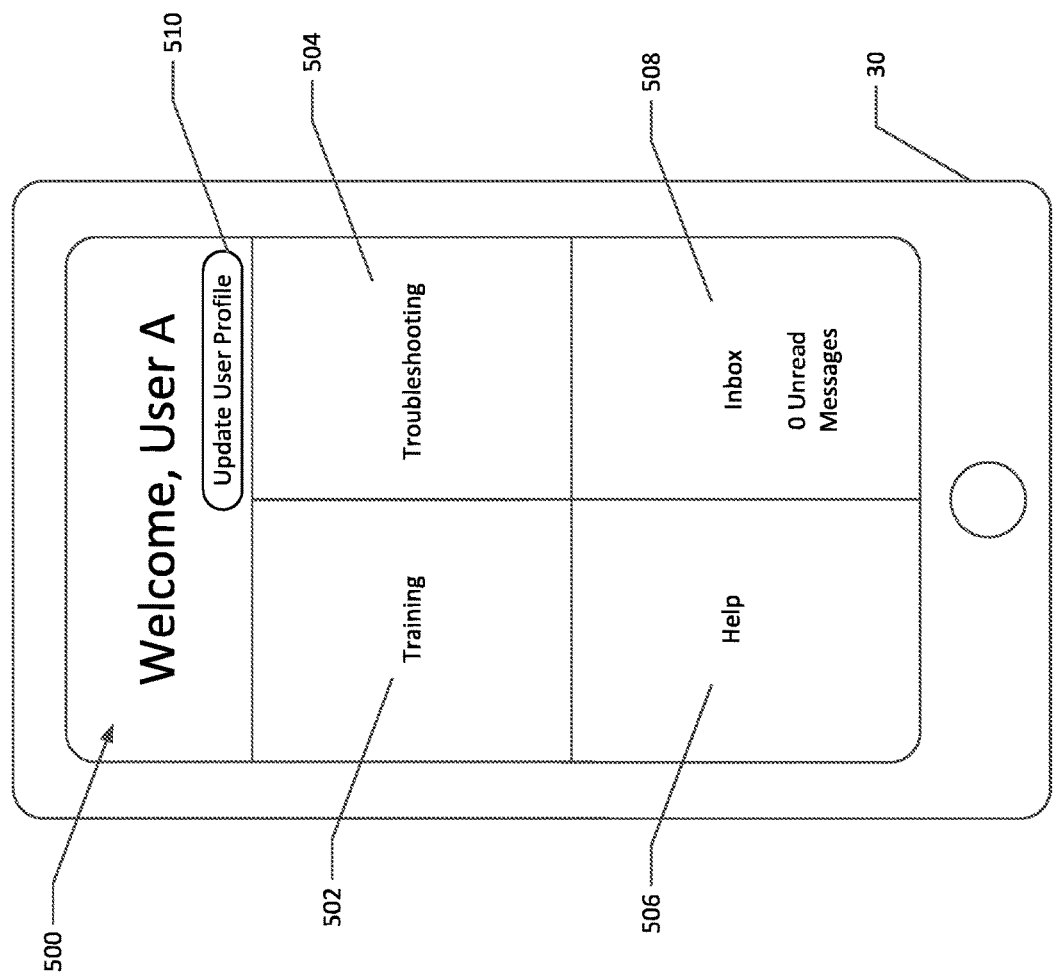
Figure 6:
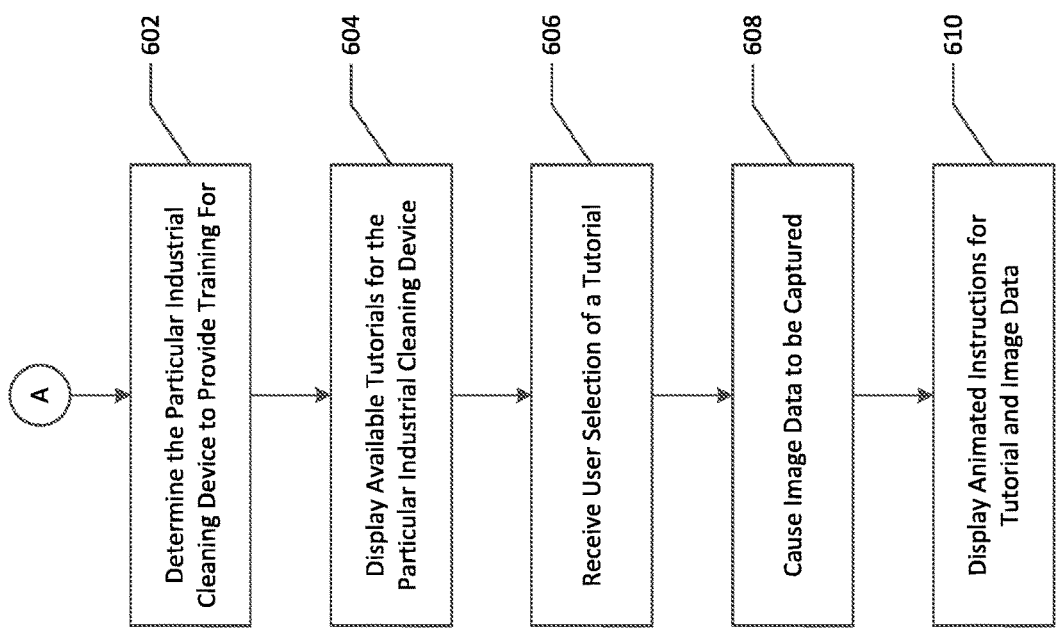

Remaining with FIG. 4, if the user computing entity 30 determines at step 410 that input indicating user selection of the communication option 508 was not received, the process continues to step 414. At step 414, the user computing entity 30 determines if input indicating user selection of another option was received. If the user computing entity determines that input indicating user selection of another option has been received, then the process continues to step 416. At step 416, the user computing entity 30 provides one or more functions related to the selected option. For example, if at step 414 it is determined that the user provided input via the user computing entity 30 selecting the update user profile option 510, the interactive user interface may facilitate the user updating information stored in association with the user's user profile. It should be understood that a variety of other options may be provided in various applications. For example, the calendar features described above as being associated with the communication portal may be provided as a separate feature. In another example, a record maintenance task feature described above as being associated with the help option 506 may be provided as a separate feature. Various other features may be provided as appropriate for the application.

It should be understood that one or more steps described above as being completed by the user computing entity 30 may be completed at least in part by the support system 100 (e.g., via the training module 130, troubleshooting module 135, help module 140, device database 145, and/or the like). It should also be understood that the above method may be modified as appropriate for the application.

V. Maintenance and Usage Tracking

As noted above, in various embodiments, the industrial cleaning device and/or user computing entity 30 may be configured to provide maintenance and/or usage tracking information to the support system 100. For example, if the user computing entity 30 determines that the status of an indicator associated with a particular industrial cleaning device indicates that a chemical supply bottle is empty and/or nearly empty and should be replaced, information/data related to the chemical supply bottle, the date, the time, and/or the like may be provided to the support system 100 (e.g., by the industrial cleaning device, user computing entity 30, and/or the like). Thus, usage of dispensable products by a particular industrial cleaning device and/or a population of industrial cleaning devices may be monitored by the support system 100 and/or other appropriate computing entity (e.g., a user computing entity 30). Similarly, information related to maintenance tasks performed in association with a particular industrial cleaning device may be provided to the support system 100 by the industrial cleaning device and/or the user computing entity 30. For example, if the status of an indicator indicates that a hose is clogged, information/data related to the clogged hose, the maintenance task used to unclog the hose, the user who performed the maintenance task, the outcome of the completion of the maintenance task, and/or the like may be provided to the support system 100. In this manner, best practices for resolving particular issues may be determined and/or tracked, users in need of additional training may be identified, and maintenance tasks may be tracked.

In one embodiment, the industrial cleaning device is in communication with the support system 100 via one or more wired or wireless networks (e.g., network 50). The industrial cleaning device may provide status information/data related to the industrial cleaning devices and/or parts of the industrial cleaning device to the support system 100. For example, the pump of a particular industrial cleaning device may have experienced a fault. The fault information/data may be provided to the support system 100. The support system 100 may then provide at least a portion of the fault information/data to the user computing entity 30. When the user points the image capture device associated with the user computing entity 30 at the particular industrial cleaning device, the pump may be shown in red and/or information/data related to the pump fault may be displayed to the user. In another embodiment, the industrial cleaning device may be configured to provide fault information to the user computing entity 30 via one or more wired or wireless networks.

The user computing entity 30 may be further configured to provide a user with one or more additional E-tools related to one or more industrial cleaning devices. For example, in various embodiments, a user computing entity 30 may be configured to receive information/data related to user feedback and/or user innovation suggestions regarding one or more industrial cleaning devices. The user computing entity 30 may be further configured to provide the user feedback information/data and/or user innovation suggestions to the support system 100. In another example, the user computing entity 30 may be configured to provide a user with access to one or more social media accounts, groups, and/or the like related to one or more industrial cleaning devices.

VI. Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing an interactive user interface for technical assistance for an industrial cleaning device, the system comprising:
   at least one memory storing technical assistance data associated with at least one industrial cleaning device;
   a display configured for providing the interactive user interface; and
   at least one processor configured to at least:
      responsive to receiving input indicating user selection, via the interactive user interface, of a help option: initiate a help communication session; and
      the at least one processor further configured to perform at least one of:
      (a) responsive to receiving input indicating user selection, via the interactive user interface, of a training option:
         cause training image data to be captured via an image capture device associated with the system, the training image data associated with the industrial cleaning device; and
         cause display of first animated instructions and the training image data via the interactive user interface, the first animated instructions displayed over the training image data such that at least a portion of the first animated instructions that relates to at least a portion of the industrial cleaning device is displayed over the training image data associated with the portion of the industrial cleaning device, the first animated instructions configured to guide a user through a first maintenance task associated with the industrial cleaning device; or
      (b) responsive to receiving input indicating user selection, via the interactive user interface, of a troubleshooting option:
         cause troubleshooting image data associated with the industrial cleaning device to be captured via the image capture device associated with the system;
         based at least in part on the troubleshooting image data, determine the status of one or more indicators associated with the industrial cleaning device;
         based at least in part on the status of the one or more indicators, identify a second maintenance task for the industrial cleaning device; and
         cause display of second animated instructions and the troubleshooting image data via the interactive user interface, the second animated instructions displayed over the troubleshooting image data such that at least a portion of the second animated instructions that relates to the at least a portion of the industrial cleaning device is displayed over the troubleshooting image data associated with the portion of the industrial cleaning device, the second animated instructions configured to guide the user through the second maintenance task associated with the industrial cleaning device.

2. The system of claim 1 wherein, to initiate a help communication session, the at least one processor is configured to:
   provide information related to the industrial cleaning device to a help system; and
   receive information related to completing the first or second maintenance task.

3. The system of claim 2 wherein the information is provided and received via at least one of a live video chat, text messages, instant messaging, or electronic mail.

4. The system of claim 2 wherein the received information related to completing the first or second maintenance task causes the corresponding one of the training or troubleshooting image data to be captured, the corresponding one of the training or troubleshooting image data associated with the industrial cleaning device; and
   cause display of the first or second animated instructions and the corresponding one of the training or troubleshooting image data via the interactive user interface, the first or second animated instructions displayed over the corresponding one of the training or troubleshooting image data such that at least a portion of the first or second animated instructions that relate to the at least a portion of the industrial cleaning device is displayed over the corresponding one of the training or troubleshooting image data associated with the portion of the industrial cleaning device, the first or second animated instructions configured to guide the user through the corresponding one of the first or second maintenance task associated with the industrial cleaning device.

5. The system of claim 1 wherein the first or second animated instructions are scaled such that the portion of the first or second animated instructions that relates to the portion of the industrial cleaning device are displayed at corresponding sizes.

6. The system of claim 1 wherein the at least one processor is further configured to identify the industrial cleaning device based on at least one of received input indicating user selection of the industrial cleaning device or the training or troubleshooting image data associated with the industrial cleaning device.

7. The system of claim 1 wherein the first or second maintenance task is at least one of turning the industrial cleaning device on, changing out a chemical supply bottle, clearing a clogged hose, performing daily maintenance, or performing weekly maintenance.

8. The system of claim 1 wherein the industrial cleaning device is configured to provide cleaning solution for at least one of cleaning a floor, a ware washer, or a commercial laundry operation.

9. The system of claim 1 further comprising a user computing entity, the user computing entity configured to display the first or second animated instructions and the corresponding one of the training or troubleshooting image data, the first or second animated instructions displayed over the corresponding one of the training or troubleshooting image data such that at least a portion of the first or second animated instructions that relate to the at least a portion of the industrial cleaning device is displayed over the corresponding one of the training or troubleshooting image data associated with the portion of the industrial cleaning device.

10. The system of claim 9 wherein the user computing entity is at least one of a mobile computing device or a heads up display.

11. A method for providing an interactive user interface for technical assistance for a device, the method comprising:
 causing a display of a user computing entity to provide an interactive user interface
 receiving input indicating user selection of a technical support option via the interactive user interface;
 responsive to receiving input indicating user selection of a help option:
  initiating a help communication session; and
 at least one of:
  (a) responsive to receiving input indicating user selection, via the interactive user interface, of a training option:
   causing training image data to be captured via an image capture device associated with the user computing entity, the image data associated with the device; and
   causing display of first animated instructions and the training image data via the interactive user interface, the first animated instructions displayed over the training image data such that at least a portion of the first animated instructions that relate to at least a portion of the device is displayed over the training image data associated with the portion of the device, the first animated instructions configured to guide a user through a first maintenance task associated with the device; or
  (b) responsive to receiving input indicating user selection, via the interactive user interface, of a troubleshooting option:
   causing troubleshooting image data associated with the device to be captured via the image capture device associated with the user computing entity;
   based at least in part on the troubleshooting image data, determining the status of one or more indicators associated with the device;
   based at least in part on the status of the one or more indicators, identifying a second maintenance task for the device; and
   causing display of second animated instructions and the troubleshooting image data via the interactive user interface, the second animated instructions displayed over the troubleshooting image data such that at least a portion of the second animated instructions that relate to at least a portion of the device is displayed over the troubleshooting image data associated with the portion of the device, the second animated instructions configured to guide the user through the a second maintenance task associated with the device.

12. The method of claim 11 wherein initiating a help communication session comprises:
 providing information related to the device to a help system; and
 receiving information related to completing the first or second maintenance task.

13. The method of claim 12 wherein the information is provided and received via at least one of a live video chat, text messages, instant messaging, or electronic mail.

14. The method of claim 12 receiving information related to completing the first or second maintenance task comprises:
 causing the corresponding one of the training or troubleshooting image data to be captured via the image capture device associated with the user computing entity, the corresponding one of the training or troubleshooting image data associated with the device; and
 causing display of the first or second animated instructions and the corresponding one of the training or troubleshooting image data, the first and second animated instructions displayed over the corresponding one of the training or troubleshooting image data such that at least a portion of the first or second animated instructions that relate to at least a portion of the device is displayed over the corresponding one of the training or troubleshooting image data associated with the portion of the device, the animated instructions configured to guide the user through the first or second maintenance task associated with the device.

15. The method of claim 11 further comprising scaling the first or second animated instructions such that (a) the portion of the first and second animated instructions that relates to the portion of the device and (b) the portion of the device are displayed at corresponding sizes.

16. The method of claim 11 further comprising identifying the device based on at least one of received input indicating user selection of the device or the training or troubleshooting image data associated with the device.

17. The method of claim 11 wherein the first or second maintenance task is at least one of turning the device on, changing out a chemical supply bottle, clearing a clogged hose, performing daily maintenance, or performing weekly maintenance.

18. The method of claim 11 wherein the device is configured to provide cleaning solution for at least one of cleaning a floor, a ware washer, or a commercial laundry operation.

19. A computer program product for providing an interactive user interface for technical assistance for an industrial cleaning device, the computer program product comprising at least one non-transitory computer-readable storage medium having computer-readable program code portions stored therein, the computer-readable program code portions comprising:
 an executable portion configured to cause a user computing entity executing the executable portion to provide an interactive user interface;
 an executable portion configured to receive input indicating user selection, via the interactive user interface, of a technical support option;
 an executable portion configured to, in response to receiving input indicating user selection of a help option, initiate a help communication session; and
 at least one of:
  an executable portion configured to, responsive to receiving input indicating user selection, via the interactive user interface, of a training option, cause training image data to be captured, the training image data associated with the industrial cleaning device, and cause display of first animated instructions and the training image data via the interactive user interface, the first animated instructions displayed over the training image data such that at least a portion of the first animated instructions that relate to at least a portion of the industrial cleaning device is displayed over the training image data associated with the portion of the industrial cleaning device, the first animated instructions configured to guide a user through a first maintenance task associated with the industrial cleaning device; or an executable portion configured to, responsive to receiving input indicating user selection of a troubleshooting option, cause troubleshooting image data associated with the industrial cleaning device to be captured; based at least in part on the troubleshooting image data, determine the status of one or more indicators associated with the industrial cleaning device, based at least in part on the status of the one or more indicators, identify a second maintenance task for the industrial cleaning device, and causing display of second animated instructions and the troubleshooting image data via the interactive user interface, the second animated instructions displayed over the troubleshooting image data such that at least a portion of the second animated instructions that relate to at least a portion of the industrial cleaning device is displayed over the troubleshooting image data associated with the portion of the industrial cleaning device, the second animated instructions configured to guide the user through the second maintenance task associated with the industrial cleaning device.

20. A system for providing a user interface for technical assistance for an industrial cleaning device, the system comprising:
    a user computing entity comprising:
        at least one processor configured to:
            cause diagnostic image data associated with the industrial cleaning device to be captured;
            based at least in part on the diagnostic image data, determine a status of the industrial cleaning device;
            cause the capture of task image data associated with the performance of at least one step of a maintenance task associated with an industrial cleaning device; and
            provide at least a portion of the task image data and the status of the industrial cleaning device to a remote help system; and
    the help system comprising one or more processors configured to:
        receive the at least a portion of the task image data and the status; and
        cause display of the at least a portion of the task image data via the interactive user interface,
    wherein the help system is remotely located with respect to the user computing entity.

21. A system for providing an interactive user interface for technical assistance for an industrial cleaning device, the system comprising:
    a help system comprising one or more processors configured to:
        receive a status associated with the industrial cleaning device;
        cause help image data to be captured;
        provide at least a portion of the help image data to a remote user computing entity; and
        cause display of animated instructions for performing at least one step of a maintenance task associated with the industrial cleaning device at the remote user computing entity, the animated instructions selected based at least in part on the status; and
    the remote user computing entity comprising:
        a display configured to provide the interactive user interface
        at least one processor configured to:
            cause device image data associated with the industrial cleaning device to be captured;
            based at least in part on the device image data, determine the status of the industrial cleaning device;
            provide the status to the help system; and
            cause simultaneous display of at least a portion of the help image data, the animated instructions, and at least a portion of the device image data via the interactive user interface, the animated instructions and the at least a portion of the help image data displayed over the device image data such that at least a portion of the animated instructions that relate to at least a portion of the industrial cleaning device is displayed over the device image data associated with the portion of the industrial cleaning device, the animated instructions configured to guide a user through the maintenance task associated with the industrial cleaning device;
    wherein the help system is remotely located with respect to the remote user computing entity.

* * * * *